(12) United States Patent
Goma et al.

(10) Patent No.: US 9,831,710 B2
(45) Date of Patent: Nov. 28, 2017

(54) ELECTRIC POWER TRANSMITTING APPARATUS AND METHOD FOR CONTROLLING ELECTRIC POWER TRANSMISSION

(71) Applicant: MURATA MANUFACTURING CO., LTD., Nagaokakyo (JP)

(72) Inventors: Sinji Goma, Nagaokakyo (JP); Tsuyoshi Suesada, Nagaokakyo (JP); Akihiko Shibata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 505 days.

(21) Appl. No.: 14/452,139

(22) Filed: Aug. 5, 2014

(65) Prior Publication Data
US 2014/0339903 A1   Nov. 20, 2014

Related U.S. Application Data

(63) Continuation of application No. PCT/JP2012/076592, filed on Oct. 15, 2012.

(30) Foreign Application Priority Data

Feb. 22, 2012  (JP) .................................. 2012-035715

(51) Int. Cl.
| | |
|---|---|
| *H02J 7/02* | (2016.01) |
| *H02J 50/05* | (2016.01) |
| *H02J 4/00* | (2006.01) |
| *H04B 5/00* | (2006.01) |
| *H02J 5/00* | (2016.01) |
| *H02J 7/00* | (2006.01) |

(52) U.S. Cl.
CPC ................. *H02J 7/025* (2013.01); *H02J 4/00* (2013.01); *H02J 5/005* (2013.01); *H02J 7/0044* (2013.01); *H04B 5/0025* (2013.01); *Y10T 307/724* (2015.04)

(58) Field of Classification Search
CPC ....................................................... H02J 7/025
See application file for complete search history.

(56) References Cited

U.S. PATENT DOCUMENTS

| | | | |
|---|---|---|---|
| 6,615,023 B1 * | 9/2003 | Ehrensvard ............ | G08C 17/06 235/451 |
| 8,536,739 B2 | 9/2013 | Ichikawa et al. | |
| 2006/0176015 A1 | 8/2006 | Bersenev | |
| 2009/0079271 A1 * | 3/2009 | Jin .......................... | H02J 7/025 307/104 |

(Continued)

FOREIGN PATENT DOCUMENTS

| | | |
|---|---|---|
| EP | 1 689 062 A1 | 8/2006 |
| JP | 2006-141170 A | 6/2006 |

(Continued)

*Primary Examiner* — Jared Fureman
*Assistant Examiner* — James Evans
(74) *Attorney, Agent, or Firm* — Arent Fox LLP

(57) ABSTRACT

An electric power transmitting apparatus and a method for controlling electric power transmission that switches a connection state of a coupling electrode in accordance with the shape and the size of an electric power receiving apparatus, and a position where the electric power receiving apparatus is placed.

15 Claims, 18 Drawing Sheets

(56) References Cited

U.S. PATENT DOCUMENTS

| | | | |
|---|---|---|---|
| 2009/0302690 A1* | 12/2009 | Kubono | H02J 17/00 |
| | | | 307/109 |
| 2011/0234019 A1 | 9/2011 | Camurati et al. | |
| 2011/0316353 A1 | 12/2011 | Ichikawa et al. | |
| 2013/0300205 A1* | 11/2013 | Tzanidis | H04B 5/0037 |
| | | | 307/104 |

FOREIGN PATENT DOCUMENTS

| | | |
|---|---|---|
| JP | 2009-296857 A | 12/2009 |
| JP | 2010-267848 A | 11/2010 |
| JP | 2010-537613 A | 12/2010 |
| JP | 2012-029548 A | 2/2012 |
| WO | WO-2010-150317 A1 | 12/2010 |

* cited by examiner

FIG. 3
(a)
11(10)
(b)
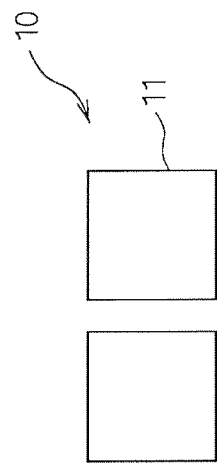
10
11
(c)
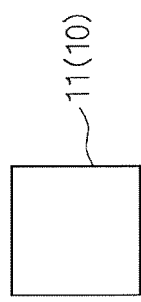
10
11
(d)
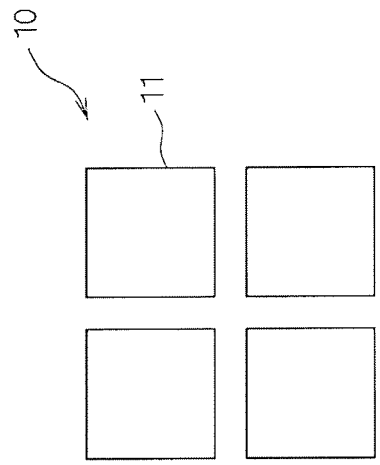
10
11

FIG. 16
(a)
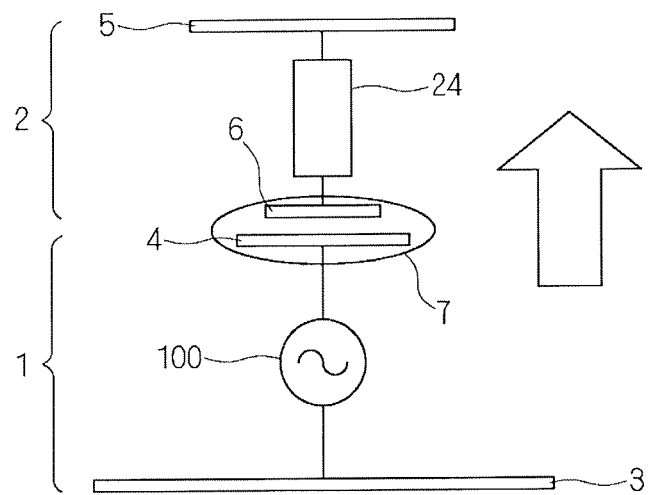
PRIOR ART
(b)
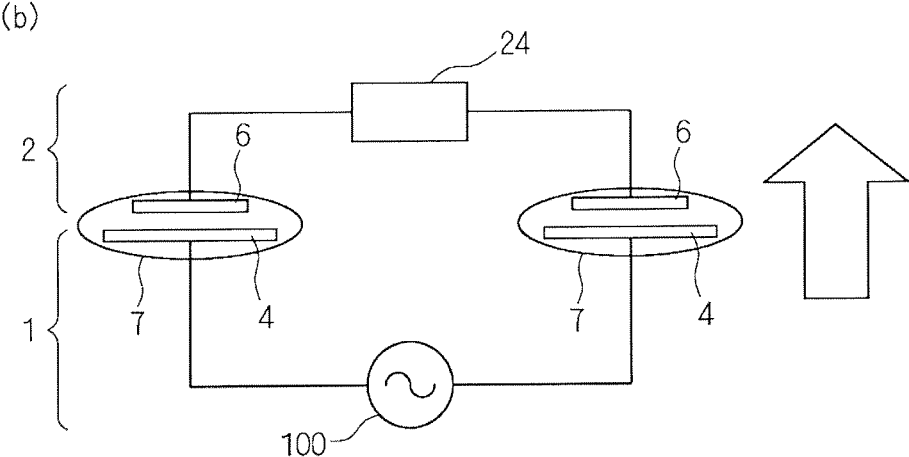
PRIOR ART

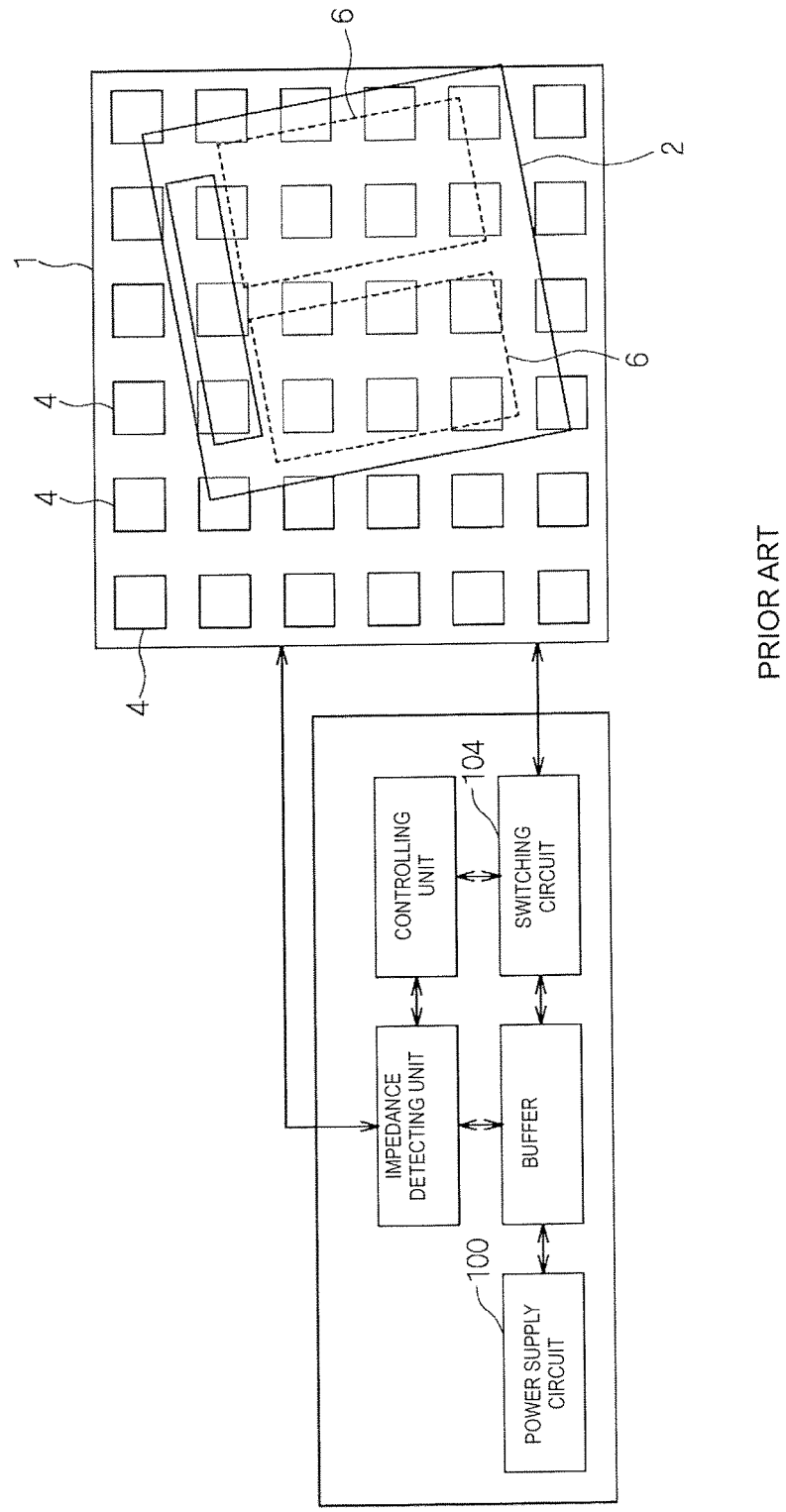

US 9,831,710 B2

ELECTRIC POWER TRANSMITTING APPARATUS AND METHOD FOR CONTROLLING ELECTRIC POWER TRANSMISSION

CROSS REFERENCE TO RELATED APPLICATIONS

The present application is a continuation of PCT/JP2012/076592 filed Oct. 15, 2012, which claims priority to Japanese Patent Application No. 2012-035715 filed Feb. 22, 2012, the entire contents of each of which are incorporated herein by reference.

FIELD OF THE INVENTION

The present invention relates to electric power transmitting apparatuses to be included in electric power transmitting systems that transmit electric power without making a physical connection and to methods for controlling electric power transmission. In particular, the present invention relates to an electric power transmitting apparatus that includes a plurality of coupling electrodes and can be used for both electric power transmission and data communication and to a method for controlling electric power transmission.

BACKGROUND OF THE INVENTION

In recent years, a number of electronic devices that contactlessly transmit electric power have been developed. In order to transmit electric power contactlessly among electronic devices, a magnetic field coupling type electric power transmitting system is often employed in which a coil module is provided in each of an electric power transmitting unit (electric power transmitting apparatus) and an electric power receiving unit (electric power receiving apparatus).

In the magnetic field coupling type electric power transmitting system, however, the magnitude of a magnetic flux that passes through each of the coil modules is greatly affected by electromotive force. Thus, in order to transmit electric power with high efficiency, the position of the coil module in the electric power transmitting unit (primary side) relative to the position of the coil module in the electric power receiving unit (secondary side) along a planar direction of the coils needs to be controlled with high precision. In addition, since the coil modules are used as coupling electrodes, it is difficult to reduce the size of the electric power transmitting unit and the electric power receiving unit. Furthermore, for electronic devices, such as a portable device, an effect of heat, radiated from a coil, on a storage battery needs to be considered, which may pose a problem that such an issue is a bottleneck in the layout design.

Thus, electric power transmitting systems that utilize, for example, an electrostatic field are being developed. Patent Document 1 discloses a transmitting system that achieves high electric power transmission efficiency by causing a coupling electrode in an electric power transmitting unit and a coupling electrode in an electric power receiving unit to generate capacitive coupling. Furthermore, Patent Document 2 discloses a capacitive coupling type charger that includes rectangular coupling electrodes disposed in a lattice pattern on a surface of an electric power transmitting stand (electric power transmitting apparatus) on which a portable terminal (electric power receiving apparatus) is to be placed, and carries out control such that electric power is supplied to coupling electrodes disposed in an area where the electric power receiving apparatus is placed.

FIG. 16 is a schematic diagram illustrating configurations of existing electric power transmitting systems. FIG. 16(a) is a schematic diagram illustrating a configuration of an electric power transmitting system that employs asymmetric capacitive coupling. As illustrated in FIG. 16(a), an electric power transmitting unit (electric power transmitting apparatus) 1 includes a large-sized passive electrode 3, a small-sized active electrode 4, and a power supply circuit (power supply) 100, and an electric power receiving unit (electric power receiving apparatus) 2 includes a large-sized passive electrode 5, a small-sized active electrode 6, and a load circuit 24. High electric power transmission efficiency is achieved by generating a strong electric field 7 across the active electrode 4 of the electric power transmitting unit 1 and the active electrode 6 of the electric power receiving unit 2.

FIG. 16(b) is a schematic diagram illustrating a configuration of an electric power transmitting system that employs symmetric capacitive coupling. As illustrated in FIG. 16(b), an electric power transmitting unit (electric power transmitting apparatus) 1 includes a plurality of active electrodes 4 and a power supply circuit (power supply) 100, and an electric power receiving unit (electric power receiving apparatus) 2 includes a plurality of active electrodes 6 and a load circuit 24.

Patent Document 1: Japanese Unexamined Patent Application Publication No. 2009-296857
Patent Document 2: European Patent No. 1689062

FIG. 17 is a schematic diagram illustrating the configuration of the existing capacitive coupling type charger disclosed in Patent Document 2. In FIG. 17, rectangular coupling electrodes 4 are disposed in a lattice pattern on a surface of an electric power transmitting stand (electric power transmitting apparatus) 1 on which a portable terminal (electric power receiving apparatus) 2 is to be placed, and a switching circuit 104 switches a state of connection between the coupling electrodes 4 and a power supply circuit 100 so that electric power is supplied to those coupling electrodes 4 disposed in an area where the electric power receiving apparatus 2 is placed. In the capacitive coupling type charger illustrated in FIG. 17, electric power is transmitted with the use of symmetric capacitive coupling illustrated in FIG. 16(b), and a connection between a coupling electrode 4 and two voltage terminals of reverse polarities is controlled to be turned on/off. In a case in which asymmetric capacitive coupling illustrated in FIG. 16(a) is to be employed, however, a connection between a coupling electrode 4, and active voltage terminals and passive voltage terminals of reverse polarities, or reference potential terminals needs to be controlled to be turned on/off. Patent Document 2 does not disclose the on/off control of the connection with the active voltage terminals, the passive voltage terminals, or the reference potential terminals, or a specific configuration of the electric power transmitting apparatus 1 that carries out such on/off control.

SUMMARY OF THE INVENTION

The present invention has been made in view of the stated issues, and the present invention is directed to providing an electric power transmitting apparatus and a method for controlling electric power transmission that allow a connection state of a coupling electrode to be switched in accordance with the shape and the size of an electric power receiving apparatus, a position where the electric power receiving apparatus is placed, and so forth, even in a case in which asymmetric capacitive coupling is employed.

To achieve the aforementioned purpose, an electric power transmitting apparatus according to the present invention includes a first active electrode and a first passive electrode serving as electric power transmitting electrodes, and the first active electrode and the first passive electrode are disposed opposing, respectively, a second active electrode and a second passive electrode of an electric power receiving apparatus so as to generate capacitive coupling. The electric power transmitting apparatus further includes a power supply circuit unit that includes an active terminal and a passive terminal having a lower potential than the active terminal, a reference potential terminal connected to a reference potential, a plurality of electric power transmission units that are disposed on an electric power transmitting surface and are each formed by one or a plurality of the electric power transmitting electrodes, switching elements that switch connection states of the electric power transmission units such that each electric power transmission unit is connected to the active terminal, is connected to the passive terminal, or either is connected to the reference potential terminal or is not connected to any terminal, and a controlling circuit unit that controls operations of the switching elements on the basis of information pertaining to the positions of the second active electrode and the second passive electrode of the electric power receiving apparatus.

With the configuration described above, the connection states of the electric power transmission units (electric power transmitting electrodes) of the electric power transmitting apparatus can be switched through the switching elements such that each electric power transmission unit (electric power transmitting electrode) is connected to the active terminal, is connected to the passive terminal, or either is connected to the reference potential terminal or is not connected to any terminal, on the basis of the information pertaining to the positions of the second active electrode and the second passive electrode of the electric power receiving apparatus, and thus electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position. Furthermore, since a voltage is applied only to a limited electric power transmission unit, power consumption can be reduced, and an unnecessary electric field can be prevented from radiating to the outside.

In addition, to achieve the aforementioned purpose, an electric power transmitting apparatus according to the present invention includes a first active electrode and a first passive electrode serving as electric power transmitting electrodes, and the first active electrode and the first passive electrode are disposed opposing, respectively, a second active electrode and a second passive electrode of an electric power receiving apparatus so as to generate capacitive coupling. The electric power transmitting apparatus further includes a power supply circuit unit that includes an active terminal and a passive terminal having a lower potential than the active terminal, a reference potential terminal connected to a reference potential, a plurality of electric power transmission units that are disposed on an electric power transmitting surface and are each formed by one or a plurality of the electric power transmitting electrodes, switching elements that switch connection states of the electric power transmission units such that each electric power transmission unit is connected to the active terminal, is connected to the passive terminal, is connected to the reference potential terminal, or is not connected to any terminal, and a controlling circuit unit that controls operations of the switching elements on the basis of information pertaining to the positions of the second active electrode and the second passive electrode of the electric power receiving apparatus.

With the configuration described above, the connection states of the electric power transmission units (electric power transmitting electrodes) of the electric power transmitting apparatus can be switched through the switching elements such that each electric power transmission unit (electric power transmitting electrode) is connected to the active terminal, is connected to the passive terminal, is connected to the reference potential terminal, or is not connected to any terminal, on the basis of the information pertaining to the positions of the second active electrode and the second passive electrode of the electric power receiving apparatus, and thus electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position. Furthermore, since a voltage is applied only to a limited electric power transmission unit, power consumption can be reduced, and an unnecessary electric field can be prevented from radiating to the outside.

In addition, it is preferable that the power supply circuit unit be provided in a plurality in the electric power transmitting apparatus according to the present invention.

With the configuration described above, since the power supply circuit unit is provided in a plurality, even in a case in which a plurality of electric power receiving apparatuses are placed on the electric power transmitting apparatus, electric power can be transmitted stably, and the plurality of electric power receiving apparatuses can be charged simultaneously.

In addition, it is preferable that the electric power transmission unit be formed by one of the electric power transmitting electrodes in the electric power transmitting apparatus according to the present invention.

With the configuration described above, since the electric power transmission unit is formed by a single electric power transmitting electrode, the connection state can be switched for each electric power transmitting electrode, and electric power can be transmitted reliably with high efficiency no matter where the electric power receiving apparatus is placed.

In addition, it is preferable that the switching elements be connected to all of the electric power transmitting electrodes, respectively, in the electric power transmitting apparatus according to the present invention.

With the configuration described above, since the switching elements are connected to all of the electric power transmitting electrodes, respectively, the connection state can be switched for each of the electric power transmitting electrodes in a more appropriate manner in accordance with the position at which the electric power receiving apparatus is placed.

In addition, it is preferable that an area in which an electric power transmission unit connected to the power supply circuit unit through the switching element is disposed be luminously displayed in the electric power transmitting apparatus according to the present invention.

With the configuration described above, since the area in which the electric power transmission unit connected to the power supply circuit unit through the switching element is disposed is luminously displayed, it is possible to visually recognize which part of the electric power transmitting apparatus on which the electric power receiving apparatus is placed is used to transmit electric power, and it becomes easier to recognize whether or not another electric power receiving apparatus can be placed.

In addition, it is preferable that the electric power transmitting apparatus according to the present invention includes a communication unit configured to carry out data communication with the electric power receiving apparatus and that the controlling circuit unit successively connects the electric power transmission units with the communication unit so as to identify the electric power transmission unit capable of data communication with the electric power receiving apparatus, and, on the basis of the position of the identified electric power transmission unit, the controlling circuit unit controls the switching elements to switch the connection states of the electric power transmission units such that each electric power transmission unit is connected to the active terminal, is connected to the passive terminal, or either is connected to the reference potential terminal or is not connected to any terminal.

The configuration described above makes it possible to switch the connection states through the switching elements such that each electric power transmitting electrode functions as the first active electrode, functions as the first passive electrode, functions as the reference potential electrode, or either functions as a communication coupling electrode or is not connected to any terminal, on the basis of the position of the electric power transmission unit capable of data communication with the electric power receiving apparatus when connected to the communication unit.

In addition, it is preferable that the electric power transmitting apparatus according to the present invention include a communication unit configured to carry out data communication with the electric power receiving apparatus and that the controlling circuit unit successively connects the electric power transmission units with the communication unit so as to identify the electric power transmission unit capable of data communication with the electric power receiving apparatus, and, on the basis of the position of the identified electric power transmission unit, the controlling circuit unit controls the switching elements to switch the connection states of the electric power transmission units such that each electric power transmission unit is connected to the active terminal, is connected to the passive terminal, is connected to the reference potential terminal, or is not connected to any terminal.

The configuration described above makes it possible to switch the connection states through the switching elements such that each electric power transmitting electrode functions as the first active electrode, the first passive electrode, the reference potential electrode or a communication coupling electrode, or is not connected to any terminal, on the basis of the position of the electric power transmission unit capable of data communication with the electric power receiving apparatus when connected to the communication unit.

In addition, it is preferable that the electric power transmitting apparatus according to the present invention include, as the electric power transmitting electrodes, the first active electrode, a first communication electrode, and the first passive electrode that are disposed opposing, respectively, the second active electrode, a second communication electrode, and the second passive electrode, disposed between the second active electrode and the second communication electrode, of the electric power receiving apparatus so as to generate capacitive coupling.

With the configuration described above, it is possible to identify the position of the second communication electrode through data communication with the electric power receiving apparatus and to switch the connection state of each of the electric power transmitting electrodes of the electric power transmitting apparatus on the basis of the relationship between the identified position of the second communication electrode and the positions of the second active electrode and the second passive electrode of the electric power receiving apparatus. Thus, electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position.

Subsequently, to achieve the aforementioned purpose, an electric power transmission controlling method according to the present invention is an electric power transmission controlling method for controlling an electric power transmitting operation of an electric power transmitting apparatus that includes a first active electrode and a first passive electrode serving as electric power transmitting electrodes that are disposed opposing, respectively, a second active electrode and a second passive electrode of an electric power receiving apparatus so as to generate capacitive coupling. The electric power transmitting apparatus further includes a power supply circuit unit that includes an active terminal and a passive terminal having a lower potential than the active terminal, a reference potential terminal connected to a reference potential, a plurality of electric power transmission units that are disposed on an electric power transmitting surface and are each formed by one or a plurality of the electric power transmitting electrodes, switching elements that switch connection states of the electric power transmission units such that each electric power transmission unit is connected to the active terminal, is connected to the passive terminal, or either is connected to the reference potential terminal or is not connected to any terminal, and a controlling circuit unit that controls operations of the switching elements. The controlling circuit unit controls the switching elements to switch the connection states such that each electric power transmitting unit is connected to the active terminal, is connected to the passive terminal, or either is connected to the reference potential terminal or is not connected to any terminal, on the basis of the information pertaining to positions of the second active electrode and the second passive electrode of the electric power receiving apparatus.

The configuration described above makes it possible to switch the connection states through the switching elements such that each of the electric power transmitting electrodes of the electric power transmitting apparatus functions as the first active electrode, the first passive electrode or the reference potential electrode, or is not connected to any terminal, on the basis of the information pertaining to the positions of the second active electrode and the second passive electrode of the electric power receiving apparatus. Thus, electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position.

In addition, to achieve the aforementioned purpose, an electric power transmission controlling method according to the present invention is an electric power transmission controlling method for controlling an electric power transmitting operation of an electric power transmitting apparatus that includes a first active electrode and a first passive electrode serving as electric power transmitting electrodes that are disposed opposing, respectively, a second active electrode and a second passive electrode of an electric power receiving apparatus so as to generate capacitive coupling. The electric power transmitting apparatus further includes a power supply circuit unit that includes an active terminal and a passive terminal having a lower potential than the active terminal, a reference potential terminal connected to a reference potential, a plurality of electric power transmission units that are disposed on an electric power transmitting surface and are each formed by one or a plurality of the electric power transmitting electrodes, switching elements that switch connection states of the electric power transmission units such that each electric power transmission unit is connected to the active terminal, is connected to the passive terminal, is connected to the reference potential terminal, or is not connected to any terminal, and a controlling circuit unit that controls operations of the switching elements. The controlling circuit unit controls the switching elements to switch the connection states such that each electric power transmitting unit is connected to the active terminal, is connected to the passive terminal, is connected to the reference potential terminal, or is not connected to any terminal, on the basis of the information pertaining to positions of the second active electrode and the second passive electrode of the electric power receiving apparatus.

The configuration described above makes it possible to switch the connection states through the switching elements such that each of the electric power transmitting electrodes of the electric power transmitting apparatus functions as the first active electrode, the first passive electrode, the reference potential electrode, or is not connected to any terminal, on the basis of the information pertaining to the positions of the second active electrode and the second passive electrode of the electric power receiving apparatus. Thus, electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position.

The electric power transmitting apparatus or the electric power transmission controlling method according to the present invention makes it possible to switch the connection states through the switching elements such that each of the electric power transmitting electrodes of the electric power transmitting apparatus functions as the first active electrode, the first passive electrode or the reference potential electrode, or is not connected to any terminal, on the basis of the information pertaining to the positions of the second active electrode and the second passive electrode of the electric power receiving apparatus. Thus, electric power can be transmitted reliably with high efficiency no matter where the electric power receiving apparatus is placed. In addition, even in a case in which a plurality of electric power receiving apparatuses are placed, the electric power transmission efficiency does not vary regardless of the placement position. Furthermore, since a voltage is applied only to a limited electric power transmission unit, power consumption can be reduced, and an unnecessary electric field can be prevented from radiating to the outside.

BRIEF DESCRIPTION OF DRAWINGS

FIG. 3 is an illustrative diagram of electric power transmission units of the electric power transmitting apparatus according to Embodiment 1 of the present invention.

FIG. 16 is a schematic diagram illustrating configurations of existing electric power transmitting systems.

FIG. 17 is a schematic diagram illustrating a configuration of an existing capacitive coupling type charger disclosed in Patent Document 2.

DETAILED DESCRIPTION OF THE EXEMPLARY EMBODIMENTS

Hereinafter, an electric power transmitting system including an electric power transmitting apparatus according to an embodiment of the present invention will be described in detail with reference to the drawings. Embodiments described hereinafter do not limit the invention set forth in the claims, and it is needless to state that not all of the combinations of characteristic features described in the embodiments are necessarily features that are essential for solving the problem.

Embodiment 1

Figure 1:
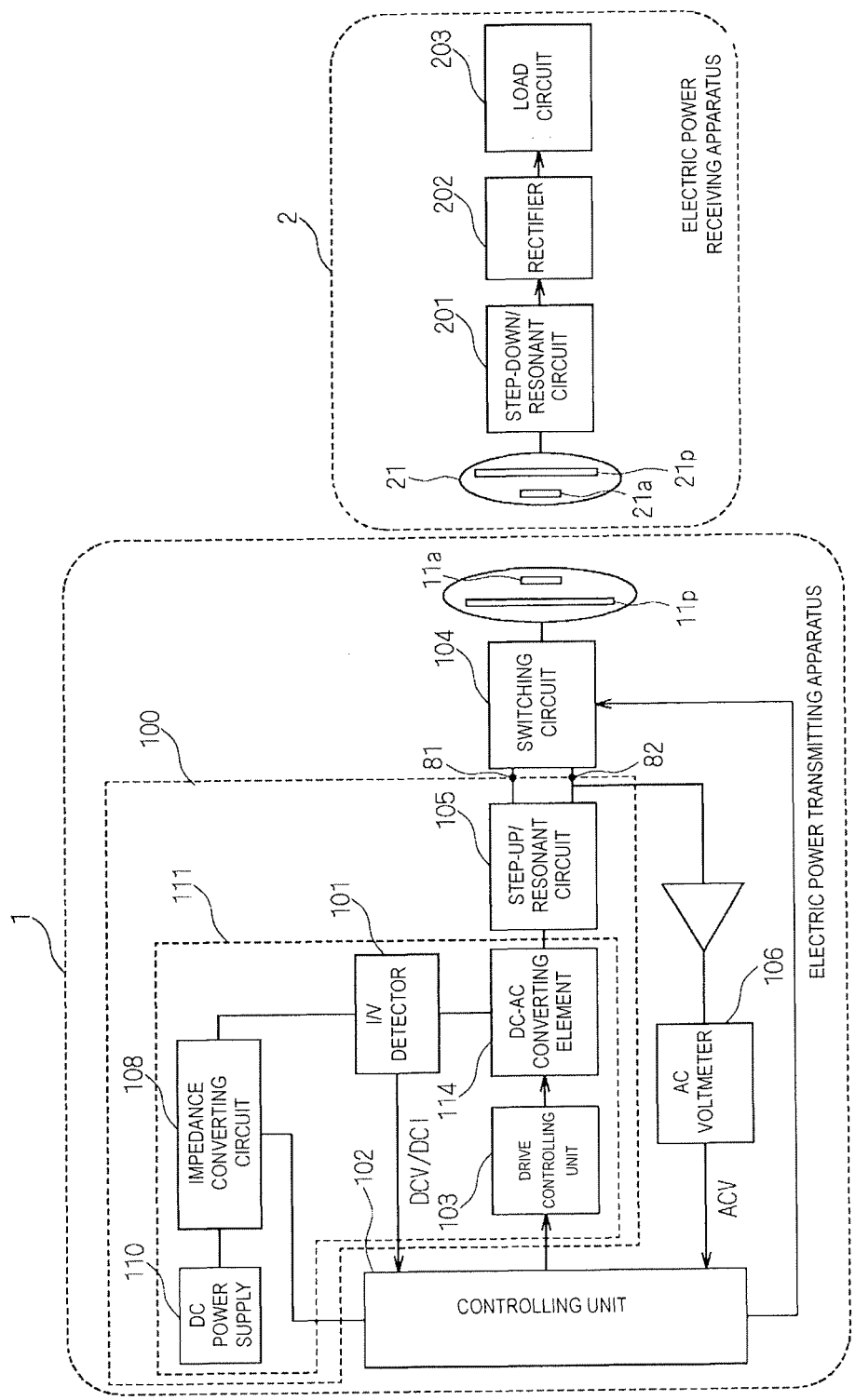
FIG. 1 is a block diagram schematically illustrating a configuration of an electric power transmitting system including an electric power transmitting apparatus according to Embodiment 1 of the present invention.
Figure 2:
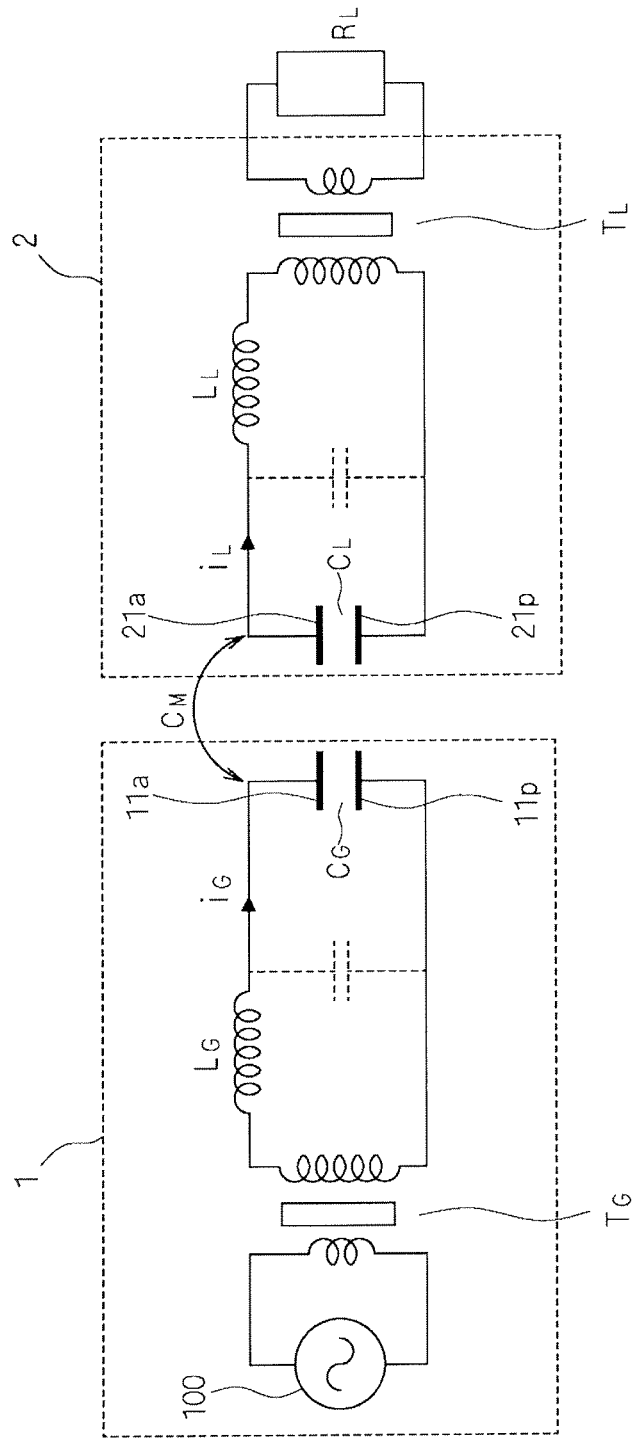
FIG. 2 is an equivalent circuit diagram of the electric power transmitting system including the electric power transmitting apparatus according to Embodiment 1 of the present invention.

FIG. 1 is a block diagram schematically illustrating a configuration of an electric power transmitting system including an electric power transmitting apparatus according to Embodiment 1 of the present invention. FIG. 2 is an equivalent circuit diagram of the electric power transmitting system including the electric power transmitting apparatus according to Embodiment 1 of the present invention. In FIG. 1 and FIG. 2, an active electrode 11a is connected to a relatively high potential active terminal 81 of a power supply (power supply circuit unit) 100 through a switching circuit (switching element) 104, and a passive electrode 11p is connected to a relatively low potential passive terminal 82 through the switching circuit 104. As illustrated in FIG. 1 and FIG. 2, the power supply (power supply circuit unit) 100, which is a high voltage high frequency power supply (alternate current (AC) power supply), includes a low voltage high frequency power supply 111 and a step-up/resonant circuit 105 that steps up an output voltage of the low voltage high frequency power supply 111.

The low voltage high frequency power supply 111 includes a direct current (DC) power supply 110, an impedance converting unit 108, a drive controlling unit 103, and a DC-AC converting element 114. The DC power supply 110, for example, supplies a predetermined DC voltage (e.g., DC 5 V). The drive controlling unit 103 and the DC-AC converting element 114 generate a high frequency voltage of, for example, 100 kHz to several tens of MHz with the DC power supply 110 serving as their power supply. The step-up/resonant circuit 105, which includes a step-up transformer TG and an inductor LG, steps up a high frequency voltage and supplies the stepped-up high frequency voltage to the first active electrode 11a. A capacitor CG indicates capacitance between the passive electrode 11p and the active electrode 11a. The inductor LG and the capacitor CG form a series resonant circuit. An I/V detector 101 detects a DC voltage value DCV and a DC current value DCI supplied from the DC power supply 110 and hands the detected DC voltage value DCV and DC current value DCI to a controlling unit 102. The controlling unit (controlling circuit unit) 102 controls the operation of the drive controlling unit 103 in accordance with outputs from the I/V detector 101 and an AC voltmeter 106, which will be described later.

The controlling unit 102 obtains the DC voltage value DCV detected by the I/V detector 101 and analyzes frequency characteristics of the obtained DC voltage value DCV so as to determine whether or not an electric power receiving apparatus 2 is placed on an electric power transmitting apparatus 1. Specifically, the power supply 100 operates as a constant current power supply by the impedance converting unit 108 converting an output impedance of the DC power supply 110 so as to sweep the frequency at a relatively low voltage until the electric power receiving apparatus 2 is placed and electric power transmission starts.

When the frequency is swept while the electric power receiving apparatus 2 is not placed on the electric power transmitting apparatus 1, a resonant frequency is not generated, and thus a maximum value does not appear in the DC voltage value DCV. In other words, a frequency is not present at which a variation amount of the DC voltage value DCV per unit frequency exceeds a predetermined value.

On the other hand, when the electric power receiving apparatus 2 is placed on the electric power transmitting apparatus 1, a resonant frequency unique to the placed electric power receiving apparatus 2 is generated. Thus, an impedance of the electric power receiving apparatus 2 seen by the power supply 100 becomes maximum, and the DC voltage value DCV takes a maximum value in the vicinity of the resonant frequency. In other words, a frequency is present at which a variation amount of the DC voltage value DCV per unit frequency exceeds a predetermined value, and thus it can be determined that the electric power receiving apparatus 2 has been placed on the electric power transmitting apparatus 1 when the aforementioned frequency is detected. When it is determined that the electric power receiving apparatus 2 has been placed on the electric power transmitting apparatus 1, the impedance converting unit 108 converts the power supply 100 to a constant voltage power supply, and the detected resonant frequency can be set as an operating frequency.

The AC voltmeter 106 detects an AC voltage value ACV of an output voltage of the step-up/resonant circuit 105 and hands the detected AC voltage value ACV to the controlling unit 102. The controlling unit 102 obtains the AC voltage value ACV detected by the AC voltmeter 106 and monitors a variation in the AC voltage value ACV.

In addition, in a case in which the obtained AC voltage value ACV is an overvoltage that exceeds a given voltage value, the controlling unit 102 stops electric power transmission by transmitting, to the drive controlling unit 103, an instruction indicating that electric power transmission is to be stopped. Furthermore, the controlling unit 102 obtains the DC current value DCI detected by the I/V detector 101, and if the obtained DC current value DCI falls below a predetermined value, the controlling unit 102 determines that a charge has been completed and stops electric power transmission.

The controlling unit 102 transmits an electric power transmission start/stop instruction to the drive controlling unit 103, and the drive controlling unit 103 causes the DC-AC converting element 114 to convert a DC voltage to an AC voltage. The DC-AC converting element 114 supplies an AC voltage to the step-up/resonant circuit 105 in accordance with an output of the drive controlling unit 103.

The step-up/resonant circuit 105 steps up the supplied AC voltage and supplies the stepped-up AC voltage to an electric power transmitting electrode 11 (first active electrode 11a, first passive electrode 11p) through the switching circuit 104. Although simplified in FIG. 1, the switching circuit 104 is provided for each electric power transmitting electrode 11 or for each electric power transmission unit 10, which will be described later, that is formed by a single or a plurality of electric power transmitting electrodes 11. The electric power transmitting electrode 11 of the electric power transmitting apparatus 1 generates capacitive coupling with an electric power receiving electrode 21 (second active electrode 21a, second passive electrode 21p) of the electric power receiving apparatus 2 so as to transmit electric power. A step-down/resonant circuit 201 formed by a step-down transformer TL and an inductor LL is connected to the electric power receiving electrode 21 of the electric power receiving apparatus 2. A capacitor CL indicates capacitance between the passive electrode 21p and the active electrode 21a. The inductor LL and the capacitor CL form a series resonant circuit. The series resonant circuit has a unique resonant frequency. A capacitor CM indicates coupling capacitance of the electric power transmitting electrode 11 and the electric power receiving electrode 21.

The electric power receiving apparatus 2 steps down the transmitted electric power with the step-down/resonant circuit 201, rectifies the electric power with a rectifier 202, and charges a load circuit 203 (secondary battery) with the rectified voltage.

In Embodiment 1, the switching circuit 104 switches a state of connection of each of the desired electric power transmitting electrodes 11 or of each of the electric power transmission units 10 that are each formed by a single or a plurality of electric power transmitting electrodes 11 so that each electric power transmitting electrode 11 or each electric power transmission unit 10 has a relatively high voltage applied thereto, has a relatively low voltage applied thereto, or either is connected to a reference potential or has no voltage applied thereto. An electric power transmitting electrode 11 or an electric power transmission unit 10 to which a relatively high voltage has been applied functions as the first active electrode 11a. An electric power transmitting electrode 11 or an electric power transmission unit 10 to which a relatively low voltage has been applied functions as the first passive electrode 11p. An electric power transmitting electrode 11 or an electric power transmission unit 10 that has been connected to the reference potential functions as a reference potential electrode.

FIG. 3 is an illustrative diagram of the electric power transmission unit 10 of the electric power transmitting apparatus 1 according to Embodiment 1 of the present invention. As illustrated in FIG. 3(a), the electric power transmission unit 10 may be formed by a single electric power transmitting electrode 11. For example, in a case in which the electric power transmitting electrodes 11 are arranged in an array on a surface of the electric power transmitting apparatus 1 on which the electric power receiving apparatus 2 is to be placed, the state of connection of the electric power transmitting electrodes 11 can be switched in accordance with the position at which the electric power receiving apparatus 2 has been placed so that each electric power transmitting electrode 11 functions as the first active electrode 11a, functions as the first passive electrode 11p, or either functions as the reference potential electrode or is not connected to any terminal.

To reduce costs as much as possible, as illustrated in FIGS. 3(b) to 3(d), for example, the electric power transmission unit 10 may be formed by two electric power transmitting electrodes 11, by three electric power transmitting electrodes 11, or by four electric power transmitting electrodes 11, and thus the electric power transmission unit 10 having an appropriate size can be formed with the size of the electric power transmitting electrode 11 and the size of the electric power receiving apparatus 2 taken into consideration. Of course, the configuration of the electric power transmission unit 10 is not limited to the configurations illustrated in FIG. 3, and the electric power transmission unit 10 may be formed by any number of the electric power transmitting electrodes 11 as long as such a configuration has a size that can efficiently transmit electric power. Hereinafter, an electric power transmitting electrode 11 encompasses an electric power transmission unit 10 formed by a single or a plurality of electric power transmitting electrodes 11.

Figure 4:
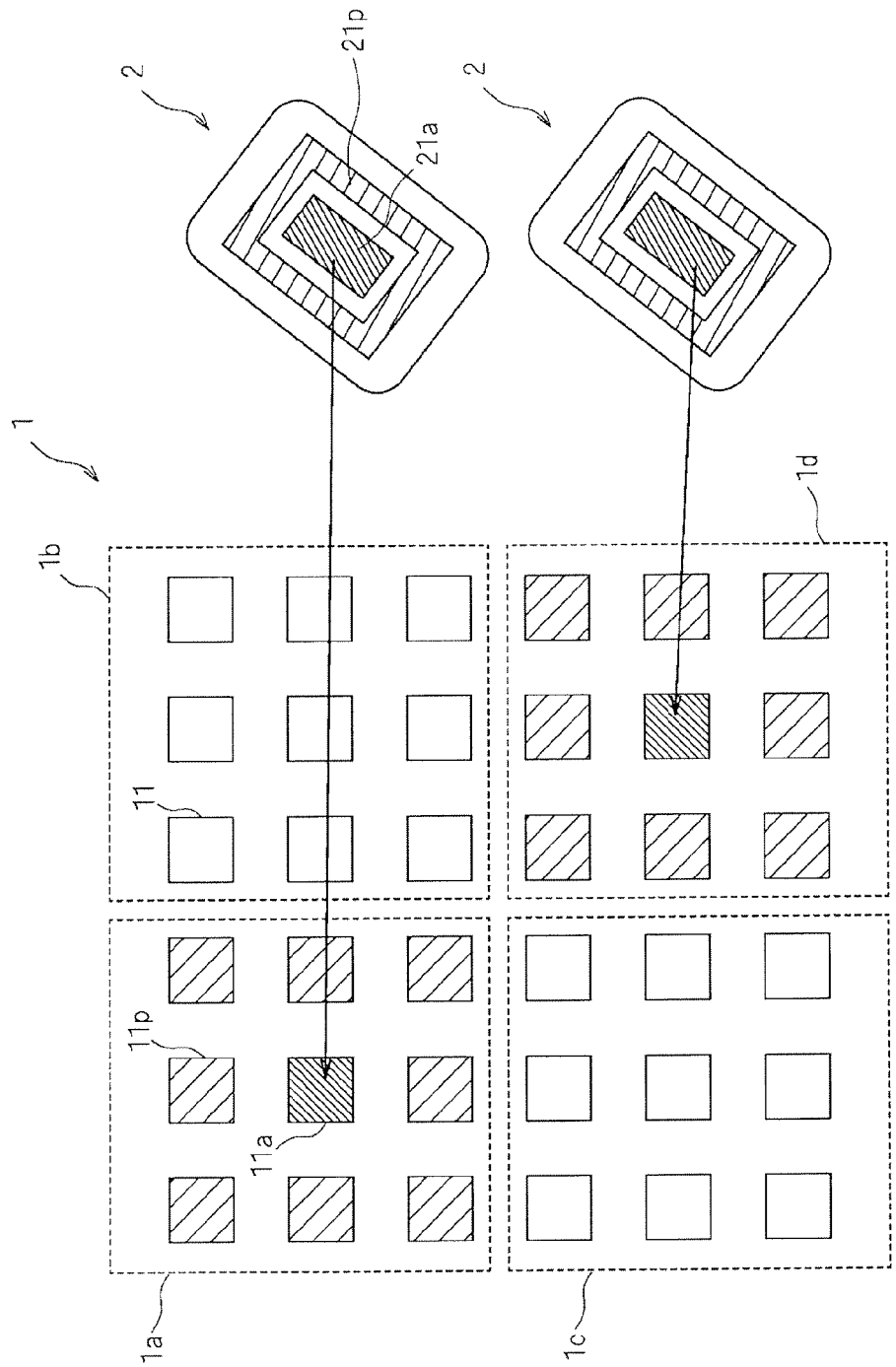
FIG. 4 is a schematic diagram illustrating a layout example and a switching state of electric power transmitting electrodes of the electric power transmitting apparatus according to Embodiment 1 of the present invention.

FIG. 4 is a schematic diagram illustrating a layout example and a switching state of the electric power transmitting electrodes 11 of the electric power transmitting apparatus 1 according to Embodiment 1 of the present invention. In the example illustrated in FIG. 4, the rectangular electric power transmitting electrodes 11 are arranged in an array, and electric power transmitting modules 1a, 1b, 1c, and 1d that are each formed by nine electric power transmitting electrodes 11 separately transmit electric power to the electric power receiving apparatus 2. In a case in which the electric power receiving apparatus 2 is placed on the electric power transmitting modules 1a, for example, the connection state is switched through the switching circuit 104 such that a relatively high voltage is applied to the electric power transmitting electrode 11 located at a center portion of the electric power transmitting module 1a in order to make the stated electric power transmitting electrode 11 function as the first active electrode 11a. In addition, the connection state is switched through the switching circuit 104 such that a relatively low voltage is applied to each of the electric power transmitting electrodes 11 disposed around the electric power transmitting electrode 11 located at the center portion of the electric power transmitting module 1a in order to make the stated electric power transmitting electrodes 11 function as the first passive electrodes 11p. It should be noted that the shape of the electric power transmitting electrode 11 is not limited to be rectangular and may be circular or polygonal. In addition, the number of the electric power transmitting electrodes 11 included in a single electric power transmitting module is not limited to nine and may be selected freely in accordance with the number and the layout of the electric power transmitting electrodes 11.

The connection state of the electric power transmitting modules 1b and 1c on which the electric power receiving apparatus 2 is not placed is switched through the switching circuit 104 such that voltages are not applied to the electric power transmitting electrodes 11, which allows power consumption to be reduced and can prevent an unnecessary electric field from radiating to the outside.

Of course, another electric power receiving apparatus 2 can be placed on an electric power transmitting module aside from the electric power transmitting module 1a, namely the electric power transmitting module 1d, for example. In such a case, in a similar manner, the connection state is switched through the switching circuit 104 such that a relatively high voltage is applied to the electric power transmitting electrode 11 located at a center portion of the electric power transmitting module 1d in order to make the stated electric power transmitting electrode 11 function as the first active electrode 11a. In addition, the connection state is switched through the switching circuit 104 such that a relatively low voltage is applied to each of the electric power transmitting electrodes 11 disposed around the electric power transmitting electrode 11 located at the center portion of the electric power transmitting module 1d in order to make the stated electric power transmitting electrodes 11 function as the first passive electrodes 11p.

Figure 5A:
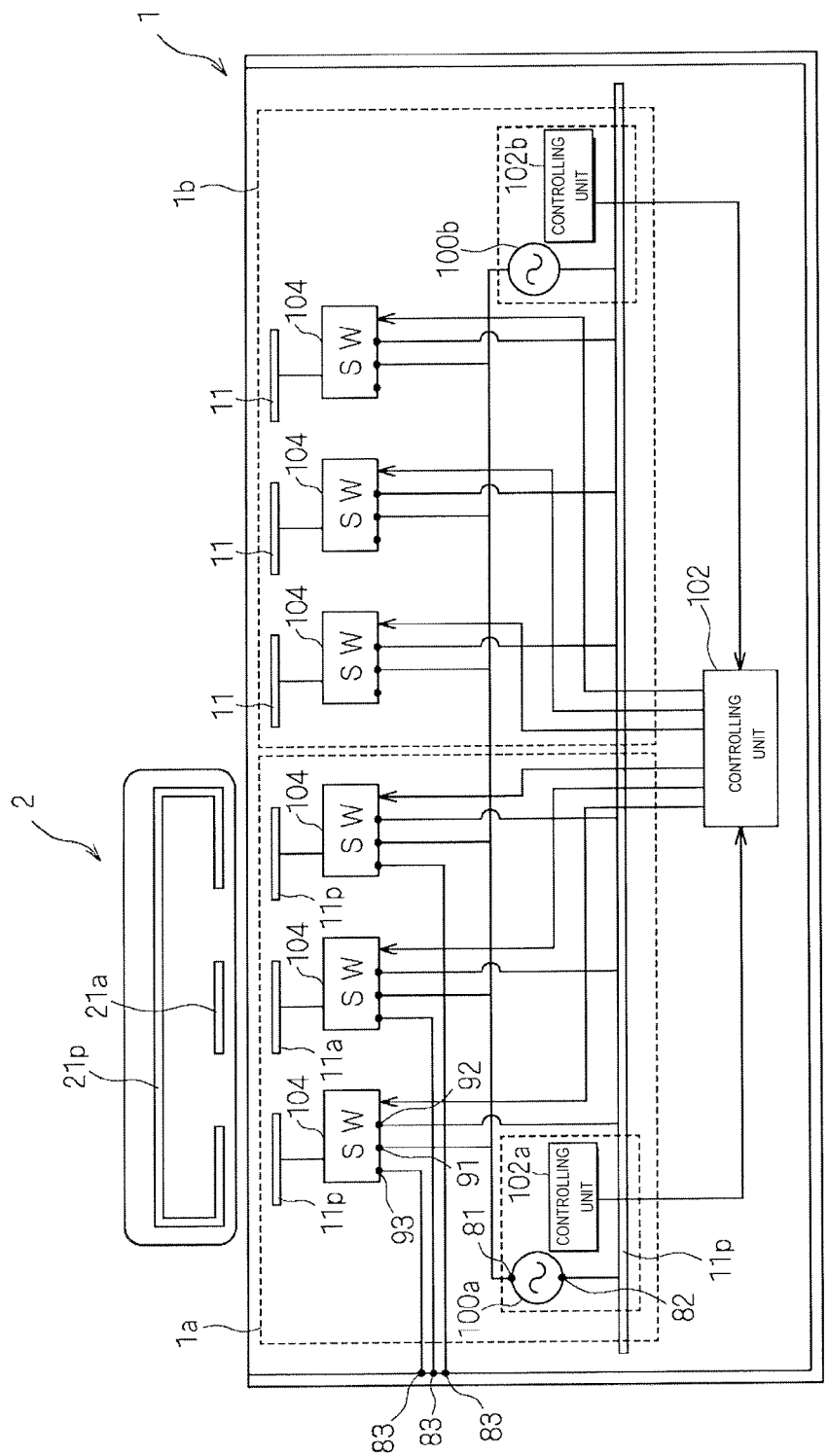
FIG. 5A is an illustrative diagram of a circuit configuration of a switching circuit in the electric power transmitting apparatus according to Embodiment 1 of the present invention.
Figure 5B:
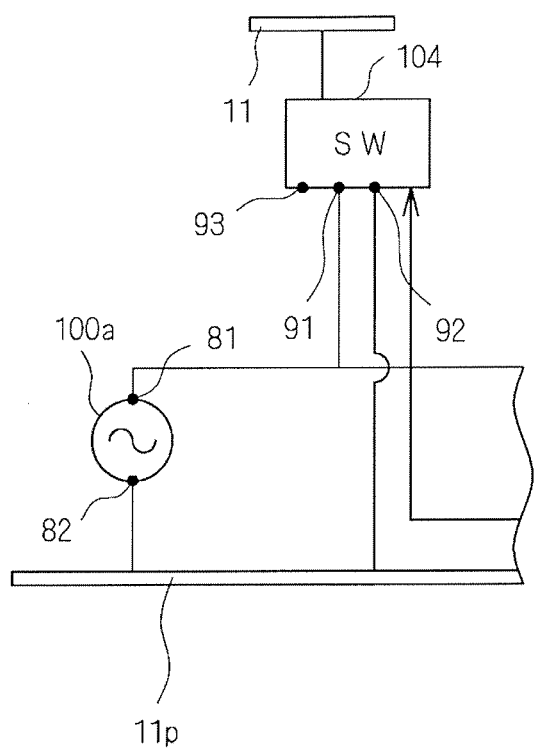
FIG. 5B is an illustrative diagram of a circuit configuration of the switching circuit in the electric power transmitting apparatus according to Embodiment 1 of the present invention.

FIG. 5A and FIG. 5B are illustrative diagrams of a circuit configuration of the switching circuit 104 in the electric power transmitting apparatus 1 according to Embodiment 1 of the present invention. As illustrated in FIG. 5A, the plurality of electric power transmitting electrodes 11 are arranged in an array on a surface (electric power transmitting surface) on which the electric power receiving apparatus 2 is to be placed. In addition, the connection state of each of the electric power transmitting electrodes 11 with the power supply 100 is switched.

In the example illustrated in FIG. 5A, the electric power transmitting module 1a and the electric power transmitting module 1b are connected to different power supplies 100. Specifically, the electric power transmitting module 1a includes a power supply 100a and a controlling unit 102a, and the electric power transmitting module 1b includes a power supply 100b and a controlling unit 102b.

The switching circuits 104 then switch the connection states of the electric power transmitting electrodes 11 and the power supply 100a or 100b in accordance with instructions from the control units 102a and 102b. In other words, the switching circuit 104 is connected at one end to a corresponding one of the electric power transmitting electrodes 11. In addition, the switching circuit 104 makes a switch so that the switching circuit 104 is connected at another end to an active terminal 91, a passive terminal 92 having a lower potential than the active terminal, or a terminal 93. The active terminal 91 of the switching circuit 104 is connected to an active terminal 81 of the power supply 100a (or the power supply 100b). The passive terminal 92 is connected to a passive terminal 82 of the power supply 100a (or the power supply 100b).

The terminal 93 is connected to a reference potential terminal 83 that is connected, for example, to a ground electrode of a circuit board of the electric power transmitting apparatus 1, a shield portion of the housing of the electric power transmitting apparatus 1, or the like so as to be connected to a reference potential (ground potential). In a case in which wiring between the reference potential and the switching circuit 104 becomes complex or the presence of the electric power transmitting electrode 11 connected to the reference potential causes the capacitance between the first active electrode 11a and the first passive electrode 11p to increase, the terminal 93 may be left unconnected as illustrated in FIG. 5B. The connection state is switched for each of the electric power transmitting electrodes 11 so that each electric power transmitting electrode 11 is connected to the active terminal 91, is connected to the passive terminal 92, or either is connected to the terminal 93, namely, connected to the reference potential terminal 83 or is not connected to any terminal.

Meanwhile, although not illustrated, in a case in which a terminal (dummy terminal) aside from the active terminal 91, the passive terminal 92, and the terminal 93 is provided, by connecting the terminal 93 to the reference potential terminal 83, it is possible to switch the connection state for each of the electric power transmitting electrodes 11 such that each electric power transmitting electrode 11 is connected to the active terminal 91, is connected to the passive terminal 92, is connected to the terminal 93 (reference potential terminal 83), or is not connected to any of these terminals (i.e., connected to the dummy terminal).

It should be noted that the determination as to whether to connect to the reference potential terminal 83 or not to connect to any terminal may be made for each of the electric power transmitting electrodes 11 in accordance with whether or not the capacitance between the first active electrode 11a and the first passive electrode 11p should be reduced (improving electric power transmission efficiency) and whether or not a sufficient shield has been implemented. When the electric power receiving apparatus 2 is placed on the electric power transmitting module 1a, the controlling unit 102a carries out the following processing.

The controlling unit 102a successively controls the operations of the switching circuits 104 to connect to the active terminals 91 in order to make the electric power transmitting electrodes 11 function as the first active electrodes 11a. The controlling unit 102a then successively supplies constant currents to the electric power transmitting electrodes 11 so as to sweep the frequency and thus analyzes the frequency characteristics of the DC voltage values DCV detected by the I/V detector 101. The controlling unit 102a determines for each of the electric power transmitting electrodes 11 whether or not each electric power transmitting electrode 11 has a frequency at which the DC voltage value DCV takes a maximum value, and determines that the second active electrode 21a of the electric power receiving apparatus 2 is disposed at a position corresponding to the position of the electric power transmitting electrode 11 that has been determined to have a frequency at which the DC voltage value DCV takes the maximum value.

In Embodiment 1, the controlling unit 102 stores, in advance, information pertaining to the positions of the second active electrode 21a and the second passive electrode 21p of the electric power receiving apparatus 2. Here, the information pertaining to the positions of the second active electrode 21a and the second passive electrode 21p of the electric power receiving apparatus 2 is, for example, information pertaining to the arrangement of the second passive electrode 21p relative to the second active electrode 21a serving as a reference. Thus, the position of the second passive electrode 21p can be obtained only by determining the position at which the second active electrode 21a of the electric power receiving apparatus 2 is disposed, and in turn the calculation processing load of the controlling unit 102a can be reduced. Of course, the information pertaining to the positions of the second active electrode 21a and the second passive electrode 21p of the electric power receiving apparatus 2 is not limited thereto. For example, the stated information may be information pertaining to the positional relationship of the reference potential electrode (ground electrode) relative to the second active electrode 21a and the second passive electrode 21p, or in a case in which data communication is carried out, the stated information may be information pertaining to the positional information of a coupling electrode for communication relative to the second active electrode 21a and the second passive electrode 21p.

In that case, first, the position at which the second active electrode 21a of the electric power receiving apparatus 2 is disposed is determined, and an electric power transmitting electrode 11 disposed at the corresponding position is determined to serve as the first active electrode 11a. Subsequently, on the basis of the information pertaining to the positions of the second active electrode 21a and the second passive electrode 21p of the electric power receiving apparatus 2, the position of the second passive electrode 21p of the electric power receiving apparatus 2 is obtained, and an electric power transmitting electrode 11 at the corresponding position is determined as the first passive electrode 11p.

In the example illustrated in FIG. 5, the controlling unit 102 retains information indicating that the second passive electrode 21p is disposed around the second active electrode 21a of the electric power receiving apparatus 2 located at the center, and thus the electric power transmitting electrodes 11 disposed around the electric power transmitting electrode 11 determined as the first active electrode 11a can be determined as the first passive electrodes 11p. The controlling unit 102a controls the operations of the switching circuits 104 such that each of the determined electric power transmitting electrodes 11 is connected to the relatively high potential active terminal 91 or the relatively low potential passive terminal 92. The active terminal 91 is connected to the active terminal 81 of the power supply 100, and the passive terminal 92 is connected to the passive terminal 82 of the power supply 100.

Figure 6:
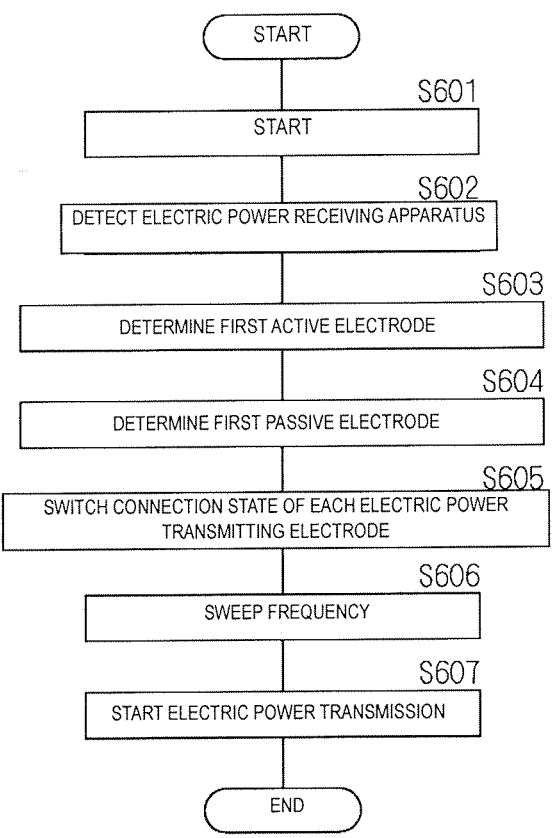
FIG. 6 is a flowchart illustrating processing procedure of a controlling unit in an electric power transmitting module of the electric power transmitting apparatus according to Embodiment 1 of the present invention.

With regard to the electric power transmitting module 1b, as in the electric power transmitting module 1a, the electric power transmitting apparatus 1 determines which electric power transmitting electrode 11 functions as the first active electrode 11a or as the first passive electrode 11p. FIG. 6 is a flowchart illustrating processing procedure of the controlling unit 102a in the electric power transmitting module 1a of the electric power transmitting apparatus 1 according to Embodiment 1 of the present invention. In FIG. 6, upon detecting a connection through an outlet or the like, the controlling unit 102a starts the electric power transmitting apparatus 1 (step S601), and determines whether or not the electric power receiving apparatus 2 has been placed on the electric power transmitting apparatus 1 (step S602). Specifically, as described above, such a determination is made on the basis of, as a result of sweeping the frequency of each of the electric power transmitting electrodes 11, whether or not an electric power transmitting electrode 11 having a frequency at which the DC voltage value takes the maximum value is present.

The controlling unit 102a determines an electric power transmitting electrode 11 having a frequency at which the DC voltage value takes the maximum value as the first active electrode 11a (step S603), and determines an electric power transmitting electrode 11 to serve as the first passive electrode 11p on the basis of the information pertaining to the positions of the second active electrode 21a and the second passive electrode 21p of the electric power receiving apparatus 2 (step S604).

The controlling unit 102a switches the connection state of each of the electric power transmitting electrodes 11 through the switching circuits 104 in accordance with the determination (step S605). Through this, each electric power transmitting electrode 11 can be made to function as the first active electrode 11a or the first passive electrode 11p in accordance with the position at which the electric power receiving apparatus 2 has been placed. The controlling unit 102a again sweeps the frequency for each of the electric power transmitting electrodes 11 (step S606). The controlling unit 102a then sets a frequency at which the DC voltage value takes the maximum value as an operating frequency of the time of transmitting electric power and starts transmitting electric power by transmitting, to the drive controlling unit 103, an instruction indicating that electric power transmission is to be started (step S607).

It should be noted that there is also a case in which the electric power receiving apparatus 2 is placed across a plurality of electric power transmitting modules. In this case, the controlling unit 102 of the electric power transmitting apparatus 1 carries out data communication with the control units 102a, 102b, and so forth of the electric power transmitting modules and determines which electric power transmitting electrode 11 of which electric power transmitting module is to function as the first active electrode 11a and which electric power transmitting electrode 11 of which electric power transmitting module is to function as the first passive electrode 11p.

Figure 7:
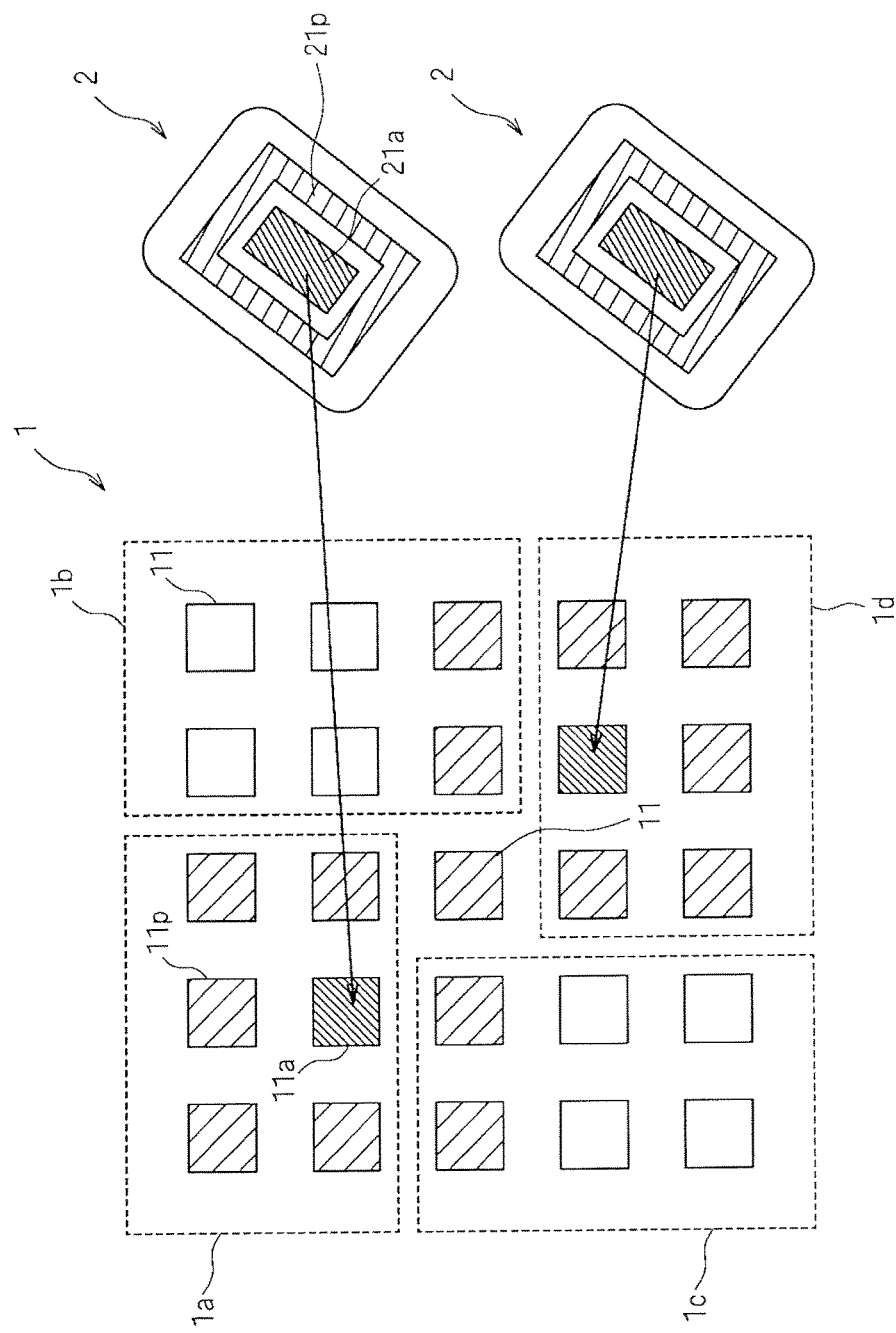
FIG. 7 is a schematic diagram illustrating another layout example and a switching state of the electric power transmitting electrodes of the electric power transmitting apparatus according to Embodiment 1 of the present invention.

FIG. 7 is a schematic diagram illustrating another layout example and a switching state of the electric power transmitting electrodes 11 of the electric power transmitting apparatus 1 according to Embodiment 1 of the present invention. In the example illustrated in FIG. 7, the rectangular electric power transmitting electrodes 11 are arranged in an array, and the electric power transmitting modules 1a, 1b, 1c, and 1d that are each formed by six electric power transmitting electrodes 11 separately transmit electric power to the electric power receiving apparatus 2. The switching of the connection state of the electric power transmitting electrode 11 located at the center is controlled by the controlling unit 102a of the electric power transmitting module 1a.

For example, in a case in which the electric power receiving apparatus 2 is placed across the electric power transmitting modules 1a and 1c, the controlling unit 102a of the electric power transmitting module 1a determines the position at which the second active electrode 21a of the electric power receiving apparatus 2 is disposed through the procedure similar to the one described above. The controlling unit 102a of the electric power transmitting module 1a determines the electric power transmitting electrodes 11 to function as the first passive electrodes 11p on the basis of the stored information pertaining to the positions of the second active electrode 21a and the second passive electrode 21p of the electric power receiving apparatus 2. In a case in which the controlling unit 102a determines that some of the electric power transmitting electrodes 11 that have been determined to function as the first passive electrodes 11p are in the other electric power transmitting module 1c, the controlling unit 102a carries out data communication with the controlling unit 102c of the electric power transmitting module 1c through the controlling unit 102, and the controlling unit 102c of the electric power transmitting module 1c controls the switching of the connection states of the electric power transmitting electrodes 11 of the electric power transmitting module 1c.

Specifically, the connection state is switched through the switching circuit 104 such that the electric power transmitting electrode 11 located at the bottom center of the electric power transmitting module 1a is connected to the relatively high potential active terminal 91 in order to make the stated electric power transmitting electrode 11 function as the first active electrode 11a. In addition, the connection state is switched through the switching circuit 104 such that the electric power transmitting electrodes 11 disposed around the electric power transmitting electrode 11 located at the bottom center of the electric power transmitting module 1a are connected to the relatively low potential passive terminals 92 in order to make the stated electric power transmitting electrodes 11 function as the first passive electrodes 11p.

The connection states of the other electric power transmitting electrodes 11 are switched through the switching circuit 104 such that the stated electric power transmitting electrodes 11 are connected to dummy elements (not illustrated) or to the terminals 93 that are not connected to any terminals, so that voltages are not applied to these electric power transmitting electrodes 11. By switching the connection state through the switching circuit 104 such that these electric power transmitting electrodes 11 are not connected to any terminals, power consumption can be reduced, and an unnecessary electric field can be prevented from radiating to the outside.

Figure 8:
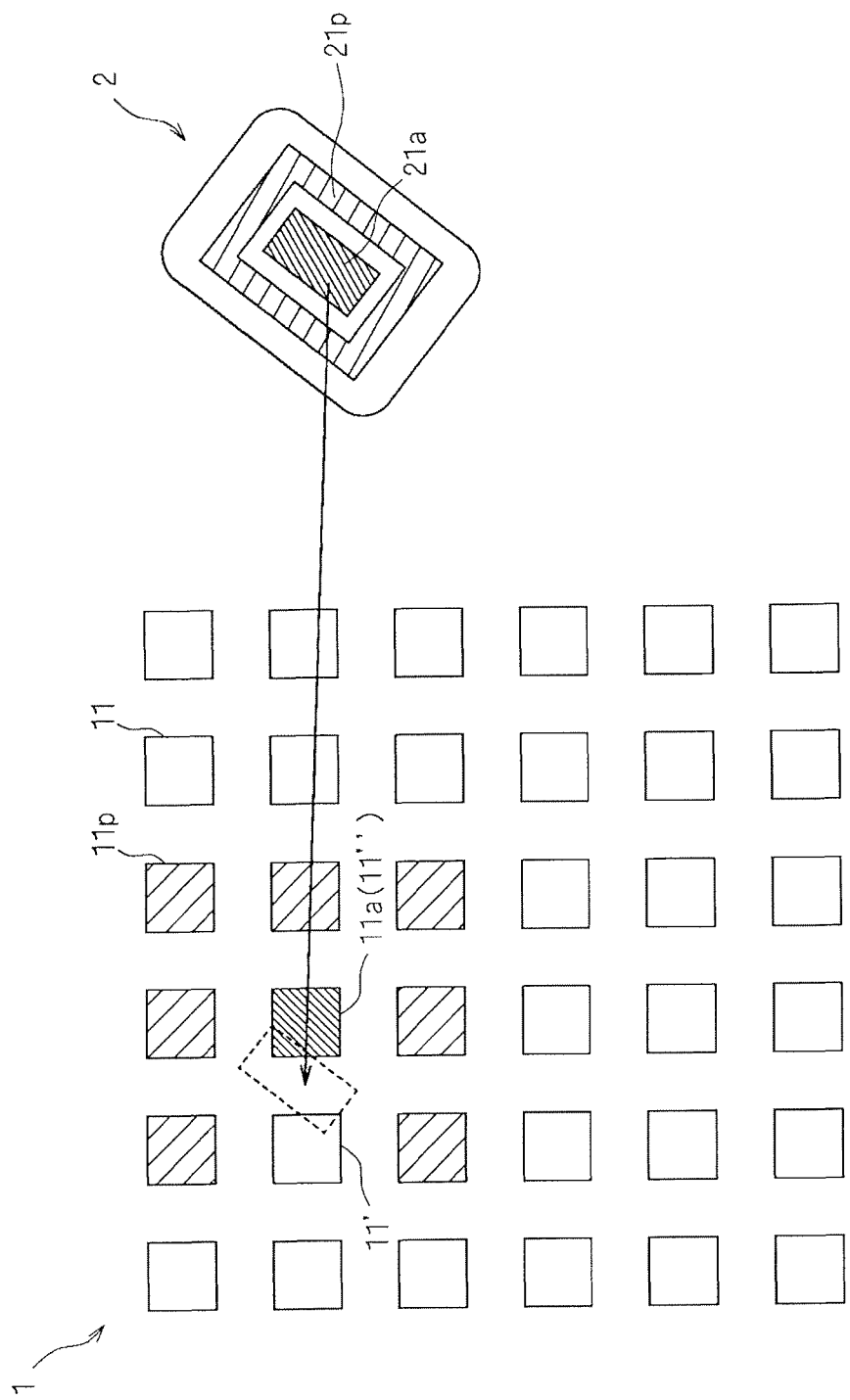
FIG. 8 is a schematic diagram illustrating another layout example and a switching state of the electric power transmitting electrodes of the electric power transmitting apparatus according to Embodiment 1 of the present invention.

It should be noted that there may be a case in which it is difficult to uniquely determine an electric power transmitting electrode 11 to function as the first active electrode 11a depending on the position at which the electric power receiving apparatus 2 is placed. FIG. 8 is a schematic diagram illustrating another layout example and a switching state of the electric power transmitting electrodes 11 of the electric power transmitting apparatus 1 according to Embodiment 1 of the present invention. As illustrated in FIG. 8, in a case in which the electric power receiving apparatus 2 is placed at an angle to the direction in which the electric power transmitting electrodes 11 are arranged, two electric power transmitting electrodes 11' and 11" become candidates for the first active electrode 11a.

In this case, either one of the electric power transmitting electrodes 11 is determined as the first active electrode 11a on the basis of a given rule. For example, the frequency is swept for each of the electric power transmitting electrodes 11' and 11", and the electric power transmitting electrode 11 having a greater maximum value of the DC voltage value is selected. If the two have substantially the same value, the electric power transmitting electrode 11 that is closer to the center of the electric power transmitting apparatus 1 is selected. Aside from the above, rules are not particularly limited as long as such rules allow one of the electric power transmitting electrodes 11 to be selected. The connection state of the electric power transmitting electrode 11' that has not been selected is switched through the switching circuit 104 such that the electric power transmitting electrode 11' is not connected to the power supply 100. Through this, power consumption can be reduced, and an unnecessary electric field can be prevented from radiating to the outside. In addition, in a case in which the electric power transmitting electrodes 11' and 11" have substantially the same value, both of the electric power transmitting electrodes 11' and 11" may be determined as the first active electrodes 11a. For example, there may be a case in which coupling capacitance of the first active electrode 11a and the second active electrode 21a becomes insufficient if either of the electric power transmitting electrode 11' and the electric power transmitting electrode 11" is selected. In such a case, selecting both as the active electrodes makes it possible to improve the electric power transmission efficiency.

As described thus far, according to Embodiment 1, on the basis of the information pertaining to the positions of the second active electrode 21a and the second passive electrode 21p of the electric power receiving apparatus 2, the connection state can be switched through the switching circuit 104 such that each electric power transmitting electrode 11 or each electric power transmission unit 10 of the electric power transmitting apparatus 1 functions as the first active electrode 11a, functions as the first passive electrode 11p, or either functions as the reference potential electrode or is not connected to any terminal. Thus, electric power can be transmitted with high efficiency no matter where the electric power receiving apparatus 2 is placed. In addition, even in a case in which a plurality of electric power receiving apparatuses 2 are placed, the electric power transmission efficiency does not vary regardless of the placement position.

It should be noted that it is preferable that an area in which the electric power transmitting electrode 11 connected to the power supply 100 through the switching circuit 104 is disposed be luminously displayed, for example, by using LEDs or the like. Thus, it is possible to visually recognize which part of the electric power transmitting apparatus 1 on which the electric power receiving apparatus 2 is placed is used to transmit electric power, making it easier to recognize whether or not another electric power receiving apparatus 2 can be placed.

Embodiment 2

In Embodiment 2 of the present invention, constituent elements having functions identical to those of Embodiment 1 are given identical reference characters, and detailed descriptions thereof will be omitted. An electric power transmitting system including an electric power transmitting apparatus 1 according to Embodiment 2 includes a ground electrode provided in an electric power receiving apparatus 2, and differs from the electric power transmitting system according to Embodiment 1 in that a controlling unit 102 controls an operation of a switching circuit 104 such that an electric power transmitting electrode 11 located at a position corresponding to the ground electrode of the electric power receiving apparatus 2 is connected to a reference potential terminal 83.

Figure 9:
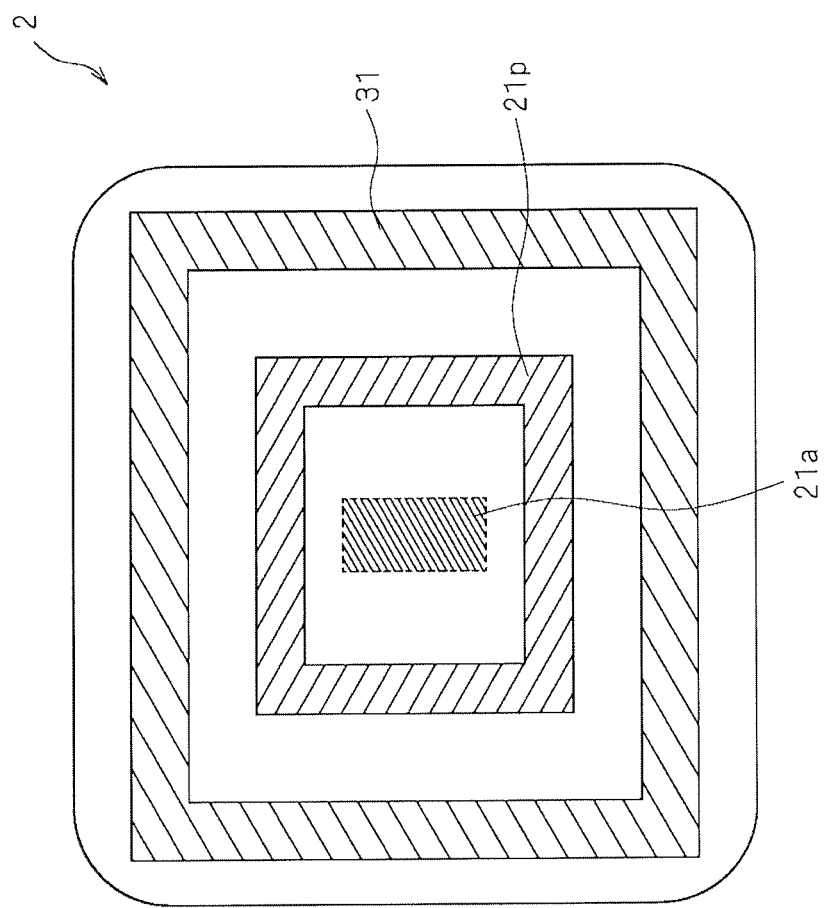
FIG. 9 is a schematic diagram illustrating a configuration of an electric power receiving apparatus in an electric power transmitting system including an electric power transmitting apparatus according to Embodiment 2 of the present invention.

FIG. 9 is a schematic diagram illustrating a configuration of the electric power receiving apparatus 2 in the electric power transmitting system including the electric power transmitting apparatus 1 according to Embodiment 2 of the present invention. As illustrated in FIG. 9, the electric power receiving apparatus 2 includes a second active electrode 21a located around the center and a second passive electrode 21p disposed so as to surround the second active electrode 21a. In addition, a ground electrode 31 is provided so as to surround the second passive electrode 21p. The ground electrode 31 may be formed, for example, as part of the housing of the electric power receiving apparatus 2 or may be provided as a separate entity.

Figure 10:
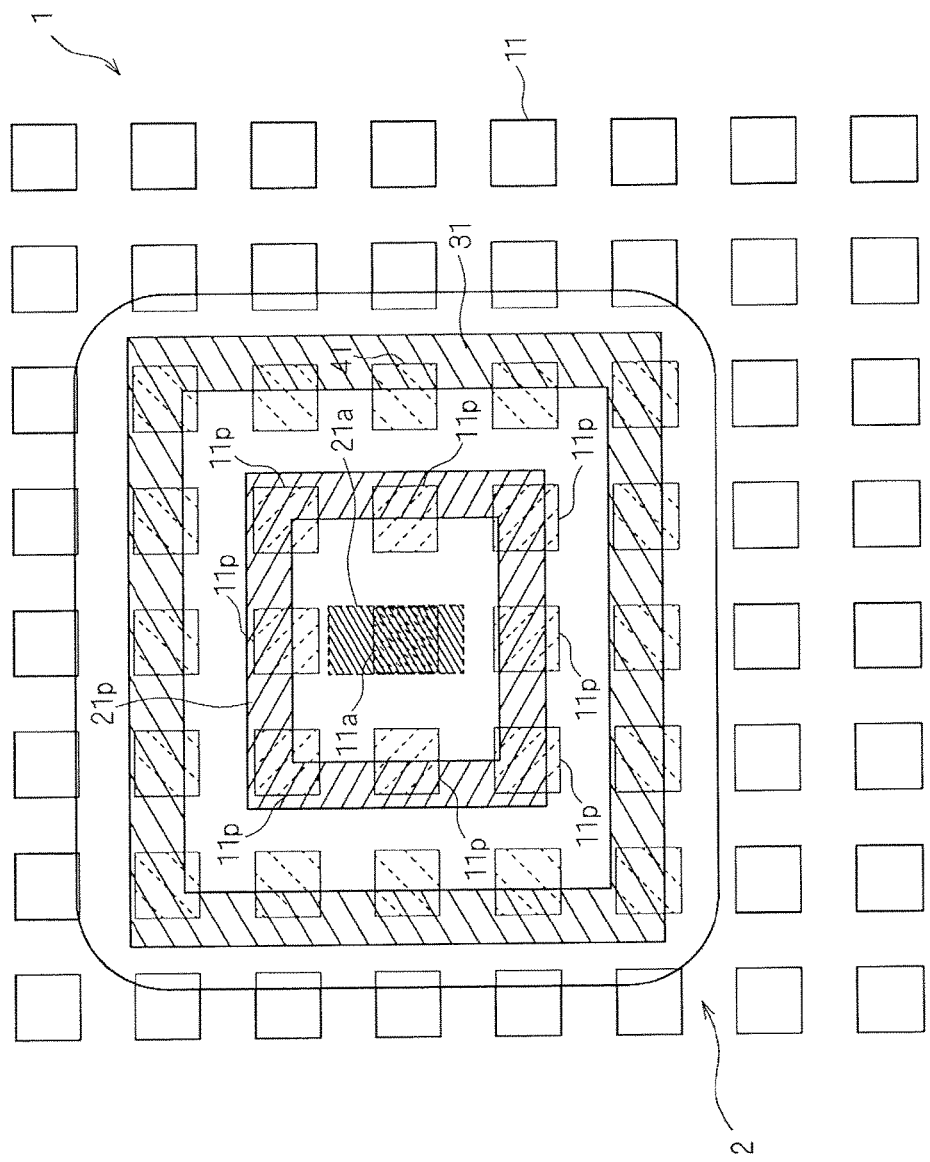
FIG. 10 is a schematic diagram illustrating a layout example and a switching state of electric power transmitting electrodes of the electric power transmitting apparatus according to Embodiment 2 of the present invention.

FIG. 10 is a schematic diagram illustrating a layout example and a switching state of the electric power transmitting electrodes 11 of the electric power transmitting apparatus 1 according to Embodiment 2 of the present invention. In the example illustrated in FIG. 10, a single electric power transmitting module in which the rectangular electric power transmitting electrodes 11 are arranged in an array will be described.

As illustrated in FIG. 10, when the electric power receiving apparatus 2 illustrated in FIG. 9 is placed on the electric power transmitting apparatus 1, the connection state is switched through the switching circuit 104 such that the electric power transmitting electrode 11 located at a position corresponding to the second active electrode 21a provided around the center of the electric power receiving apparatus 2 is connected to a relatively high potential active terminal 91 in order to make the stated electric power transmitting electrode 11 function as a first active electrode 11a. The position of the second active electrode 21a of the electric power receiving apparatus 2 is determined in a similar manner to that of Embodiment 1. In other words, the controlling unit 102 of the electric power transmitting apparatus 1 sweeps the frequency for each of the electric power transmitting electrodes 11 so as to determine whether or not there is a frequency at which the DC voltage value takes a maximum value. The controlling unit 102 determines that the second active electrode 21a of the electric power receiving apparatus 2 is disposed at a position corresponding to the electric power transmitting electrode 11 that has been determined to have a frequency at which the DC voltage value takes the maximum value.

In addition, on the basis of the information pertaining to the positions of the second active electrode 21a and the second passive electrode 21p of the electric power receiving apparatus 2, the position of the second passive electrode 21p of the electric power receiving apparatus 2 is obtained. The connection state is then switched through the switching circuit 104 such that the electric power transmitting electrodes 11 located at positions corresponding to the second passive electrode 21p of the electric power receiving apparatus 2 are connected to relatively low potential passive terminals 92 in order to make the stated electric power transmitting electrodes 11 function as first passive electrodes 11p.

Furthermore, in Embodiment 2, the information pertaining to the positions of the second active electrode 21a and the second passive electrode 21p of the electric power receiving apparatus 2 includes information pertaining to the relative positional relationship between the second passive electrode 21p and the ground electrode 31. Therefore, by obtaining the position of the second passive electrode 21p, the position of the ground electrode 31 can be obtained as well. The controlling unit 102 of the electric power transmitting apparatus 1 switches the connection state through the switching circuit 104 such that the electric power transmitting electrodes 11 located at positions corresponding to the ground electrode 31 of the electric power receiving apparatus 2 are connected to the reference potential terminals 83 in order to make the stated electric power transmitting electrodes 11 function as reference potential electrodes 41.

Figure 11:
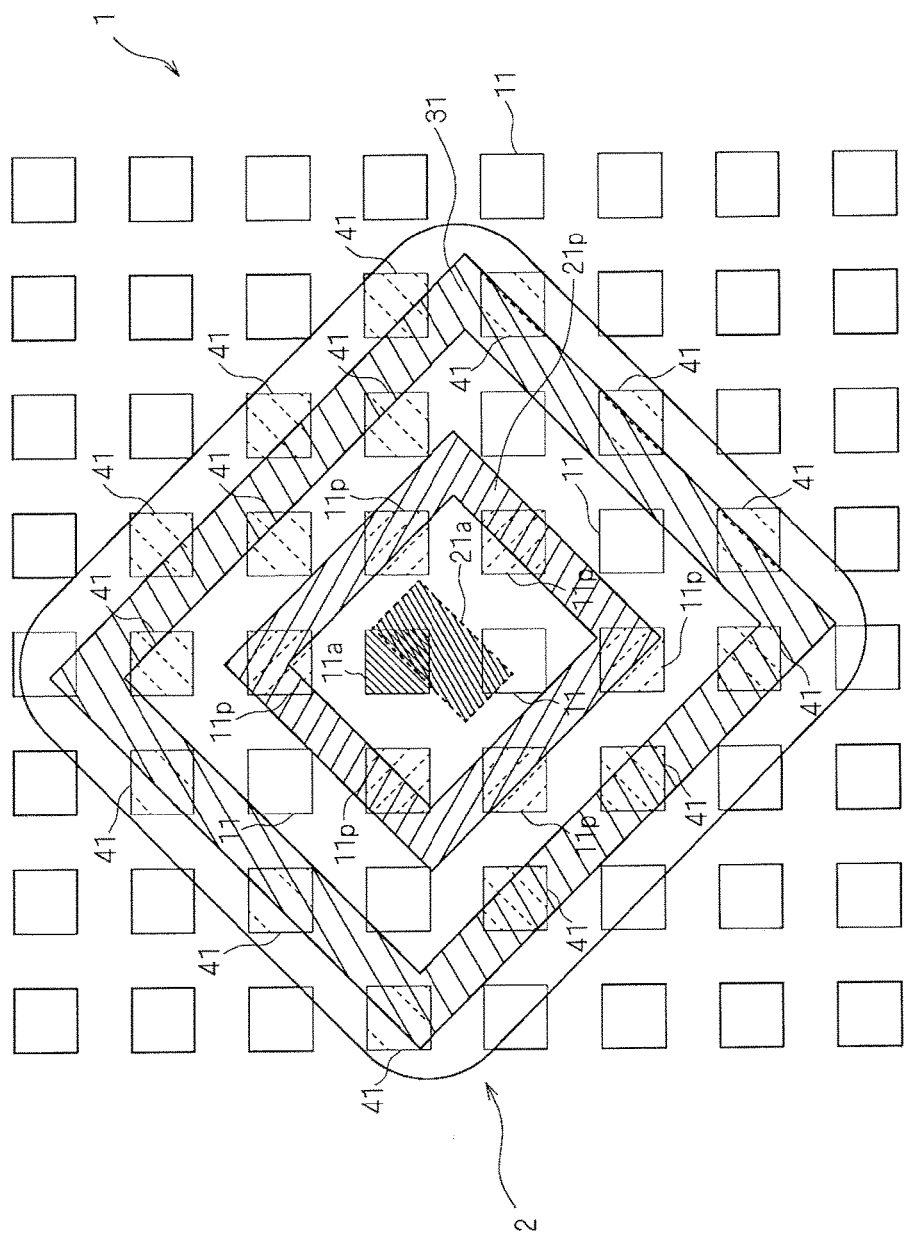
FIG. 11 is a schematic diagram illustrating another layout example and a switching state of the electric power transmitting electrodes of the electric power transmitting apparatus according to Embodiment 2 of the present invention.

It should be noted that the electric power receiving apparatus 2 may be placed at an angle to the direction in which the electric power transmitting electrodes 11 are arranged. FIG. 11 is a schematic diagram illustrating another layout example and a switching state of the electric power transmitting electrodes 11 of the electric power transmitting apparatus 1 according to Embodiment 2 of the present invention. As illustrated in FIG. 11, in a case in which the electric power receiving apparatus 2 is placed at an angle to the direction in which the electric power transmitting electrodes 11 are arranged, two electric power transmitting electrodes 11 become candidates for the first active electrode 11a. In accordance with a rule similar to the rule in Embodiment 1, the connection state is switched through the switching circuit 104 such that a selected electric power transmitting electrode 11 is connected to the active terminal 91 in order to make the selected electric power transmitting electrode 11 function as the first active electrode 11a. The connection state is then switched through the switching circuit 104 such that the electric power transmitting electrode 11 that has not been selected is not connected to a power supply 100.

In addition, the controlling unit 102 of the electric power transmitting apparatus 1 switches the connection state through the switching circuit 104 such that the electric power transmitting electrode 11 of which a large proportion overlaps the second passive electrode 21p of the electric power receiving apparatus 2 is connected to the passive terminal 92 in order to make the stated electric power transmitting electrode 11 function as the first passive electrode 11p. In a similar manner, the controlling unit 102 of the electric power transmitting apparatus 1 switches the connection state through the switching circuit 104 such that the electric power transmitting electrode 11 of which a large proportion overlaps the ground electrode 31 of the electric power receiving apparatus 2 is connected to the reference potential terminal 83 in order to make the stated electric power transmitting electrode 11 function as the reference potential electrode 41. Thus, by switching the connection state of each of the electric power transmitting electrodes 11 and the power supply 100 in accordance with the position at which the electric power receiving apparatus 2 has been placed, each of the electric power transmitting electrodes 11 can be made to function as the first active electrode 11a, the first passive electrode 11p, or the reference potential electrode 41.

As described thus far, according to Embodiment 2, on the basis of the information pertaining to the positions of the second active electrode 21a and the second passive electrode 21p of the electric power receiving apparatus 2, the connection state can be switched through the switching circuit 104 such that each electric power transmitting electrode 11 or each electric power transmission unit 10 of the electric power transmitting apparatus 1 functions as the first active electrode 11a, functions as the first passive electrode 11p, or either functions as the reference potential electrode 41 or is not connected to any terminal, and thus electric power can be transmitted with high efficiency no matter where the electric power receiving apparatus 2 is placed. In addition, even in a case in which a plurality of electric power receiving apparatuses 2 are placed, the electric power transmission efficiency does not vary regardless of the placement position.

Embodiment 3

In Embodiment 3 of the present invention, constituent elements having functions identical to those of Embodiments 1 and 2 are given identical reference characters, and detailed descriptions thereof will be omitted. An electric power transmitting system including an electric power transmitting apparatus 1 according to Embodiment 3 includes a second communication coupling electrode provided in an electric power receiving apparatus 2, and differs from the electric power transmitting systems of Embodiments 1 and 2 in that an electric power transmitting electrode 11 located at a position corresponding to the second communication coupling electrode of the electric power receiving apparatus 2 is made to function as a first communication coupling electrode.

Figure 12:
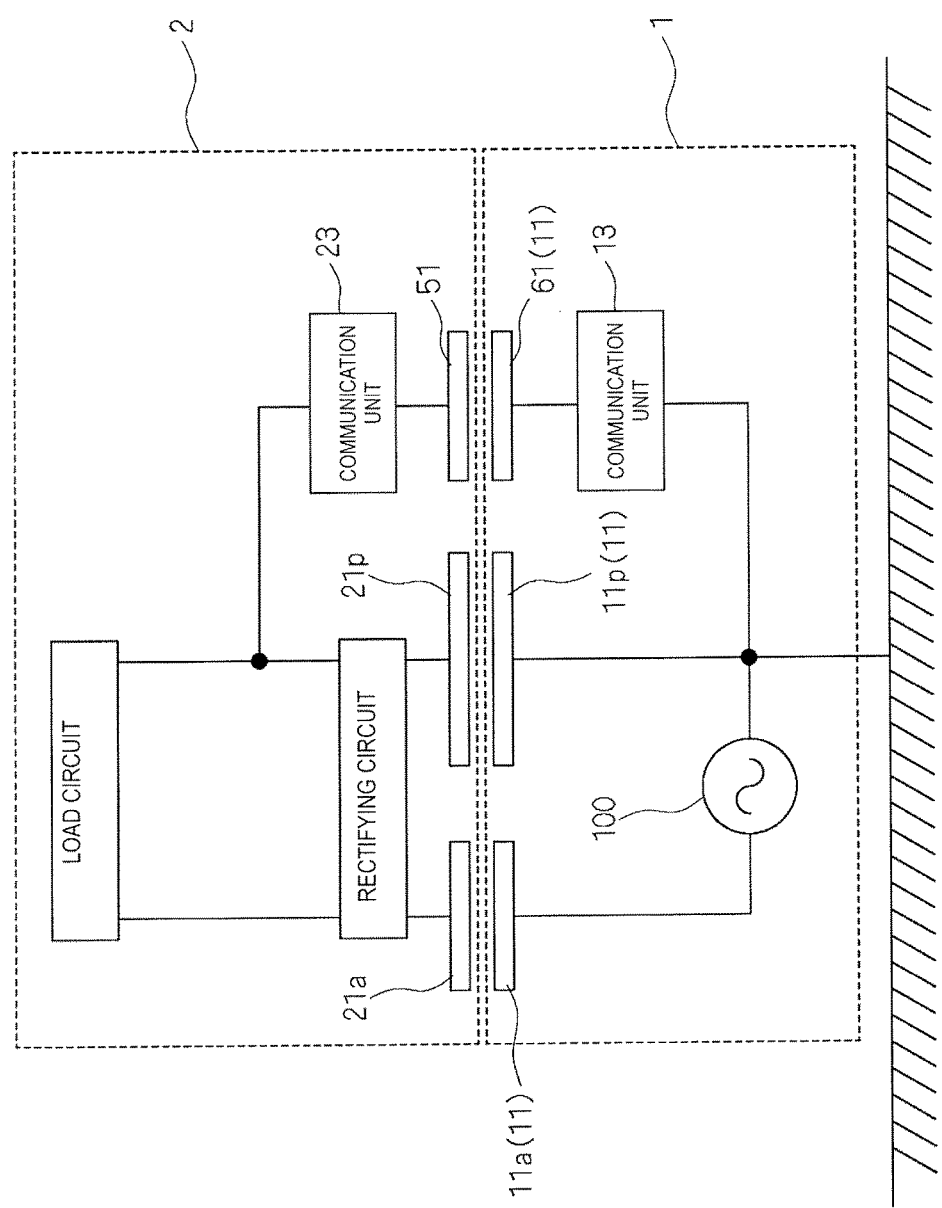
FIG. 12 is a block diagram schematically illustrating a configuration of an electric power transmitting system including an electric power transmitting apparatus according to Embodiment 3 of the present invention.

FIG. 12 is a block diagram schematically illustrating a configuration of the electric power transmitting system including the electric power transmitting apparatus 1 according to Embodiment 3 of the present invention. As illustrated in FIG. 12, the electric power transmitting apparatus 1 of the electric power transmitting system according to Embodiment 3 includes a power supply 100, the electric power transmitting electrodes 11 that each functions as a first active electrode 11a, a first passive electrode 11p, or a first communication coupling electrode 61, and a first communication unit (communication unit) 13. The electric power receiving apparatus 2 includes a rectifying circuit, a load circuit, and so on, as well as a second active electrode 21a, a second passive electrode 21p, a second communication coupling electrode 51, and a second communication unit 23.

In Embodiment 3, the first communication coupling electrode 61 of the electric power transmitting apparatus 1 is connected to a ground potential through the first communication unit 13 of the electric power transmitting apparatus 1, and the second communication coupling electrode 51 of the electric power receiving apparatus 2 is connected, through the second communication unit 23 of the electric power receiving apparatus 2, to a ground potential, such as a ground electrode of a circuit board of the electric power receiving apparatus 2, a shield portion of the electric power receiving apparatus 2, or the like. The first communication unit 13 of the electric power transmitting apparatus 1 is connected at one end to the first communication coupling electrode 61 and at another end to a ground potential of the electric power transmitting apparatus 1. In addition, the second communication unit 23 of the electric power receiving apparatus 2 is connected at one end to the second communication coupling electrode 51 and at another end to a ground potential of the electric power receiving apparatus 2.

The first passive electrode 11p is disposed between the first active electrode 11a and the first communication coupling electrode 61, and the second passive electrode 21p is disposed between the second active electrode 21a and the second communication coupling electrode 51. Thus, communication sensitivity can be enhanced, and the stability of data communication can be improved.

Figure 13:
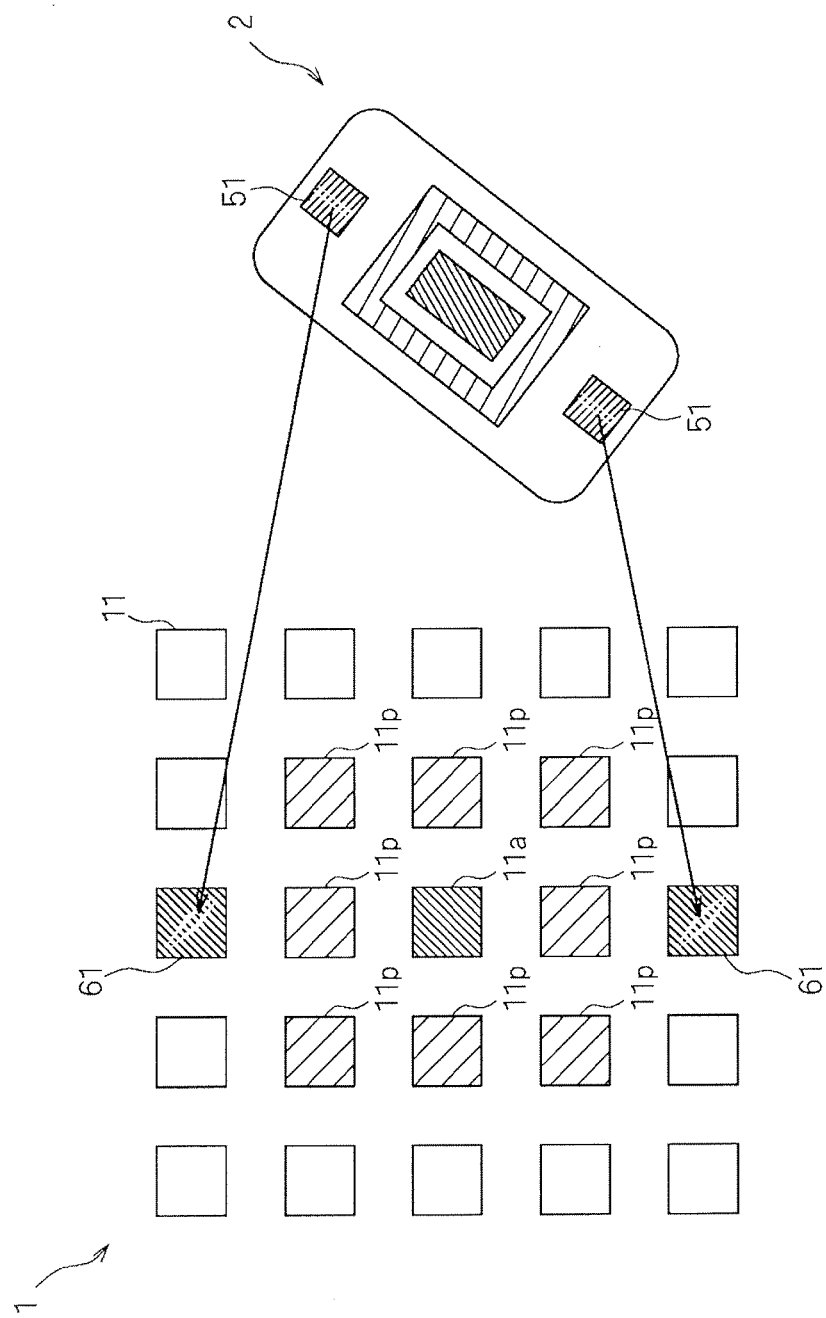
FIG. 13 is a schematic diagram illustrating a layout example and a switching state of electric power transmitting electrodes of the electric power transmitting apparatus according to Embodiment 3 of the present invention.

Then, by searching for a position at which data communication can be carried out stably, the first communication coupling electrode 61 and the second communication coupling electrode 51 can be positioned. FIG. 13 is a schematic diagram illustrating a layout example and a switching state of the electric power transmitting electrodes 11 of the electric power transmitting apparatus 1 according to Embodiment 3 of the present invention. In the example illustrated in FIG. 13, the rectangular electric power transmitting electrodes 11 are arranged in an array. The connection state is switched through the switching circuit 104, as in Embodiments 1 and 2.

Figure 14:
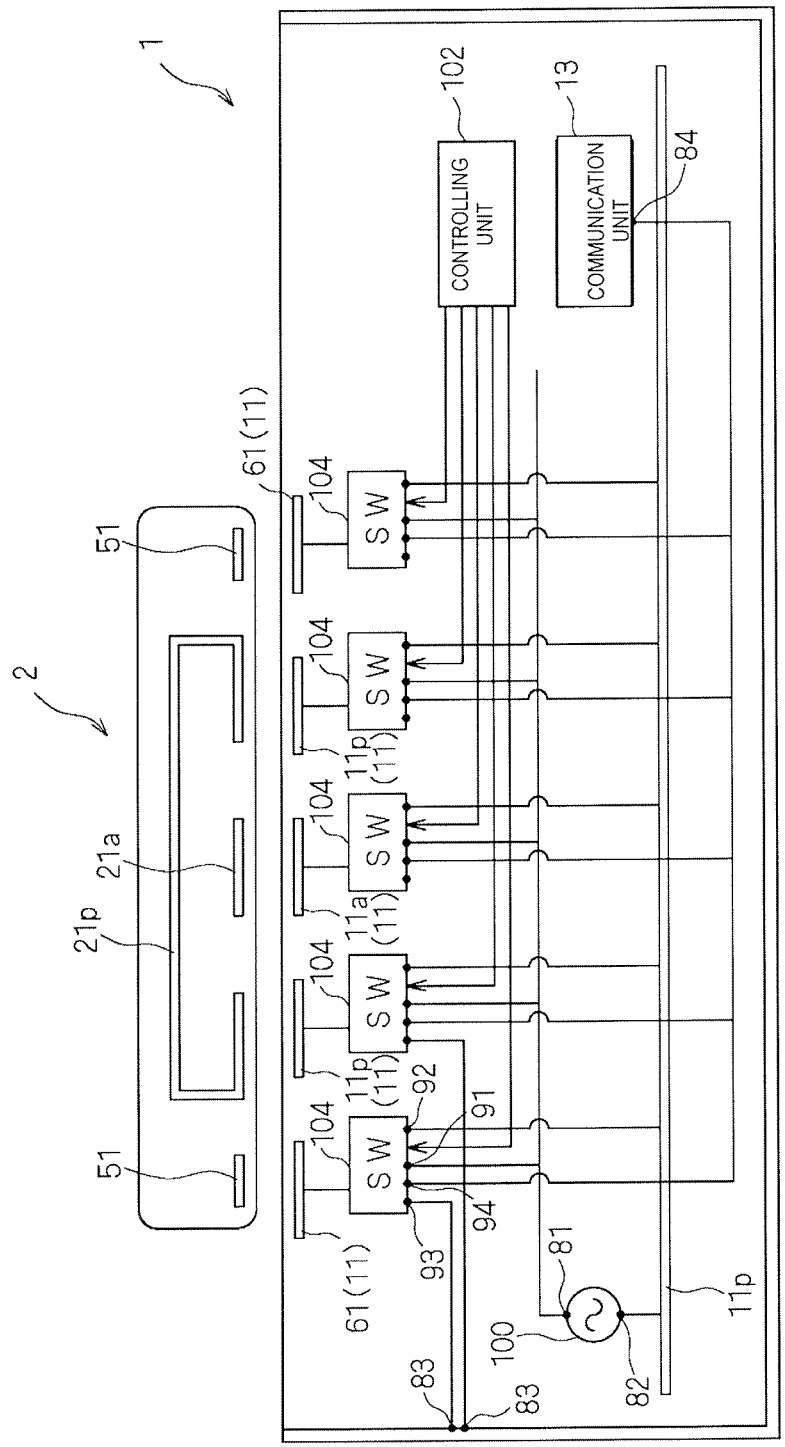
FIG. 14 is an illustrative diagram of a circuit configuration of a switching circuit in the electric power transmitting apparatus according to Embodiment 3 of the present invention.

FIG. 14 is an illustrative diagram of a circuit configuration of the switching circuit 104 in the electric power transmitting apparatus 1 according to Embodiment 3 of the present invention. As illustrated in FIG. 14, the plurality of electric power transmitting electrodes 11 are arranged in an array on a surface on which the electric power receiving apparatus 2 is to be placed. The connection state with the power supply 100 is then switched for each of the electric power transmitting electrodes 11.

The switching circuit 104 switches the connection state of the electric power transmitting electrode 11 and the power supply 100 in accordance with an instruction from the controlling unit 102. For example, when the electric power receiving apparatus 2 is placed as illustrated in FIG. 14, the controlling unit 102 carries out the following processing.

The controlling unit 102 switches the connection state through the switching circuit 104 such that the electric power transmitting electrodes 11 are successively made to function as the first communication coupling electrode 61. In other words, the controlling unit 102 successively connects the electric power transmitting electrodes 11 to communication terminals 94 that are connected to the first communication unit 13, and determines whether or not data communication with the electric power receiving apparatus 2 can be established. It should be noted that the communication terminal 94 is connected to a communication terminal 84 of the communication unit 13.

The controlling unit 102 determines that the second communication coupling electrode 51 of the electric power receiving apparatus 2 is disposed at a position corresponding to the electric power transmitting electrode 11 which, the controlling unit 102 has determined, has established data communication with the electric power receiving apparatus 2. In Embodiment 3, the information pertaining to the positions of the second active electrode 21a and the second passive electrode 21p of the electric power receiving apparatus 2 includes information pertaining to the positional relationship of the second communication coupling electrode 51 relative to the second active electrode 21a and the second passive electrode 21p. Therefore, only by determining the position at which the second communication coupling electrode 51 of the electric power receiving apparatus 2 is disposed, the positions of the second active electrode 21a and the second passive electrode 21p can be obtained.

First, the electric power transmitting electrode 11 of the electric power transmitting apparatus 1 located at a position corresponding to the second communication coupling electrode 51 of the electric power receiving apparatus 2 is determined as the first communication coupling electrode 61. Then, on the basis of the information pertaining to the positions of the second active electrode 21a and the second passive electrode 21p of the electric power receiving apparatus 2, the positions of the second active electrode 21a and the second passive electrode 21p of the electric power receiving apparatus 2 are obtained, and the electric power transmitting electrodes 11 located at the corresponding positions are determined as the first active electrode 11a and the first passive electrode 11p.

In the example illustrated in FIG. 14, the controlling unit 102 retains information indicating that an electrode disposed around the second active electrode 21a of the electric power receiving apparatus 2 at the center is the second passive electrode 21p and that the second communication coupling electrodes 51 are disposed at mutually opposing positions with the second passive electrode 21p provided therebetween. Thus, the electric power transmitting electrodes 11 that have been determined to have established data communication are first determined as the first communication coupling electrodes 61. Then, the electric power transmitting electrode 11 located at the center of an area between the two first communication coupling electrodes 61 is determined as the first active electrode 11a, and the electric power transmitting electrodes 11 around the first active electrode 11a located at the center are determined as the first passive electrodes 11p. The controlling unit 102 switches the connection state through the switching circuit 104 such that the electric power transmitting electrodes 11 that have been determined as the first active electrode 11a and the first passive electrodes 11p are connected to the relatively high potential active terminal 91 and the relatively low potential passive terminals 92, respectively. The active terminal 91 is connected to the active terminal 81 of the power supply 100, and the passive terminal 92 is connected to the passive terminal 82 of the power supply 100. In addition, although, in FIG. 14, the terminal 93 is connected to the reference potential terminal 83 that is connected, for example, to a connection electrode of a circuit board of the electric power transmitting apparatus 1, a shield portion of the housing of the electric power transmitting apparatus 1, or the like so as to be connected to a reference potential (ground potential), the terminal 93 may be left unconnected.

Figure 15:
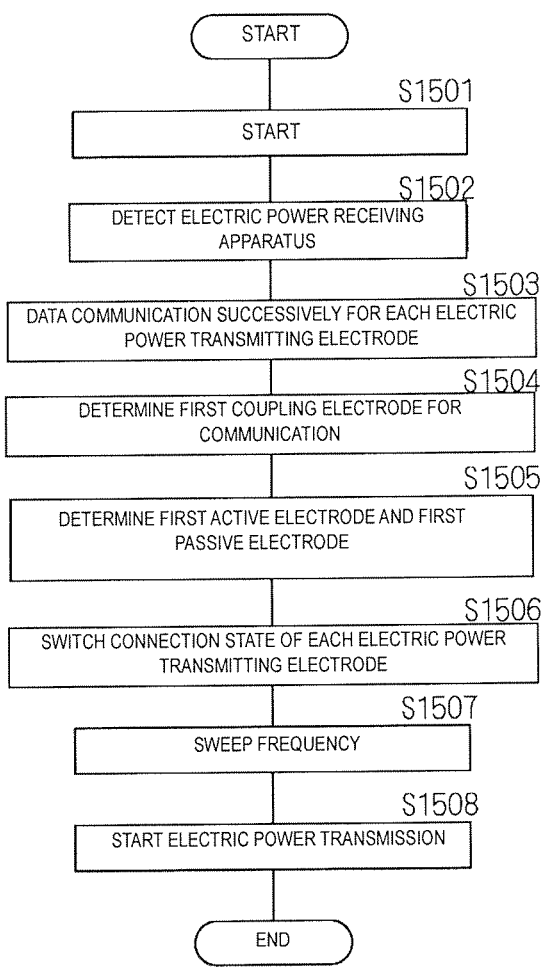
FIG. 15 is a flowchart illustrating processing procedure of a controlling unit in the electric power transmitting apparatus according to Embodiment 3 of the present invention.

FIG. 15 is a flowchart illustrating processing procedure of the controlling unit 102 in the electric power transmitting apparatus 1 according to Embodiment 3 of the present invention. In FIG. 15, upon detecting a connection through an outlet or the like, the controlling unit 102 starts the electric power transmitting apparatus 1 (step S1501), and determines whether or not the electric power receiving apparatus 2 has been placed on the electric power transmitting apparatus 1 (step S1502). Specifically, as in Embodiment 1, such a determination is made on the basis of whether or not an electric power transmitting electrode 11 having a frequency at which the DC voltage value takes a maximum value is present as a result of sweeping the frequency for each of the electric power transmitting electrodes 11.

The controlling unit 102 switches the connection states through the switching circuit 104 such that the electric power transmitting electrodes 11 successively function as the first communication coupling electrode 61 and carries out data communication (step S1503). The controlling unit 102 then determines the electric power transmitting electrode 11 that has been determined to have established data communication to serve as the first communication coupling electrode 61 (step S1504). The controlling unit 102 can estimate the position of the electric power transmitting electrode 11 that may serve as the first communication coupling electrode 61 on the basis of the position of the electric power transmitting electrode 11 having a frequency at which the DC voltage value takes the maximum value. By deciding to sequentially switch the connection state of the electric power transmitting electrodes 11 through the switching circuit 104 starting preferentially from the electric power transmitting electrode 11 located at the estimated position, the electric power transmitting electrode 11 to serve as the communication coupling electrode 61 can be determined in a shorter period of time.

Then, on the basis of the information pertaining to the positions of the second active electrode 21a and the second passive electrode 21p of the electric power receiving apparatus 2, the controlling unit 102 determines the electric power transmitting electrode 11 to function as the first active electrode 11a of the electric power transmitting apparatus 1 and the electric power transmitting electrode 11 to function as the first passive electrode 11p (step S1505).

The controlling unit 102 switches the connection state of each of the electric power transmitting electrodes 11 through the switching circuit 104 in accordance with the determination (step S1506). Through this, the electric power transmitting electrode 11 can be switched to function as the first communication coupling electrode 61, the first active electrode 11a, or the first passive electrode 11p in accordance with the position at which the electric power receiving apparatus 2 has been placed.

The controlling unit 102 again sweeps the frequency for each of the electric power transmitting electrodes 11 (step S1507). The controlling unit 102 sets a frequency at which the DC voltage value takes the maximum value as an operating frequency of the time of transmitting electric power and starts transmitting electric power by transmitting, to the drive controlling unit 103, an instruction indicating that electric power transmission is to be started (step S1508).

As described thus far, according to Embodiment 3, on the basis of the information pertaining to the positions of the second active electrode 21a and the second passive electrode 21p of the electric power receiving apparatus 2, the connection state can be switched through the switching circuit 104 such that each electric power transmitting electrode 11 or each electric power transmission unit 10 of the electric power transmitting apparatus 1 functions as the first active electrode 11a, functions as the first passive electrode 11p, functions as the reference potential electrode, or either functions as the first communication coupling electrode 61 or is not connected to the power supply 100, and thus electric power can be transmitted with high efficiency no matter where the electric power receiving apparatus 2 is placed. In addition, even in a case in which a plurality of electric power receiving apparatuses 2 are placed, the electric power transmission efficiency does not vary regardless of the placement position.

Furthermore, the present invention is not limited to the embodiments described above, and it is needless to state that various modifications, replacements, and so on can be made within the spirit of the present invention.

REFERENCE SIGNS LIST

1 ELECTRIC POWER TRANSMITTING APPARATUS
2 ELECTRIC POWER RECEIVING APPARATUS
10 ELECTRIC POWER TRANSMISSION UNIT
11 ELECTRIC POWER TRANSMITTING ELECTRODE
11a FIRST ACTIVE ELECTRODE
11p FIRST PASSIVE ELECTRODE
13 FIRST COMMUNICATION UNIT (COMMUNICATION UNIT)
21a SECOND ACTIVE ELECTRODE
21p SECOND PASSIVE ELECTRODE
51 SECOND COMMUNICATION COUPLING ELECTRODE
61 FIRST COMMUNICATION COUPLING ELECTRODE
81, 91 ACTIVE TERMINALS
82, 92 PASSIVE TERMINALS
83 REFERENCE POTENTIAL TERMINAL
84, 94 COMMUNICATION TERMINALS
93 TERMINAL
100 POWER SUPPLY (POWER SUPPLY CIRCUIT UNIT)
102, 102a CONTROLLING UNIT (CONTROL CIRCUIT UNIT)
104 SWITCHING CIRCUIT (SWITCHING ELEMENT)

The invention claimed is:

1. An electric power transmitting apparatus that includes a first active electrode and a first passive electrode that generate capacitive coupling with a second active electrode and a second passive electrode of an electric power receiving apparatus when the respective active and passive electrodes are positioned to oppose each other, respectively, the apparatus comprising:
a power supply circuit including an active terminal and a passive terminal, the passive terminal having a lower potential than the active terminal;
a reference potential terminal coupled to a reference potential;
an electric power transmitting surface having a plurality of electric power transmission units disposed thereon, and each electric power transmission unit comprising at least one electric power transmitting electrode;
a plurality of switching elements each coupled to a respective electric power transmitting electrode and each configured to switch connection states of the respective electric power transmitting electrode such that each electric power transmitting electrode is selectively connected to any one of the active terminal, the passive terminal, and the reference potential terminal; and
a control circuit that controls the switching elements based on a position of the second active electrode and the second passive electrode of the electric power receiving apparatus when the electric power receiving apparatus is positioned on the electric power transmitting surface.

2. The electric power transmitting apparatus according to claim 1, wherein each switching element is further configured to disconnect the respective electric power transmitting electrode coupled thereto from the respective active terminal, the respective passive terminal, and the respective reference potential terminal.

3. The electric power transmitting apparatus according to claim 1, wherein the power supply circuit unit comprises a plurality of power supply circuits.

4. The electric power transmitting apparatus according to claim 1, wherein the electric power transmission unit comprises one of the electric power transmitting electrodes.

5. The electric power transmitting apparatus according to claim 1, wherein the electric power transmitting surface is configured to luminously display an area where one of the electric power transmission units is coupled to the power supply circuit through the respective switching element.

6. The electric power transmitting apparatus according to claim 1, further comprising a communication unit configured to communicate data with the electric power receiving apparatus.

7. The electric power transmitting apparatus according to claim 6, wherein the control circuit connects each electric power transmission unit to the communication unit to identify the electric power transmission unit capable of data communication with the electric power receiving apparatus.

8. The electric power transmitting apparatus according to claim 7, wherein based on the position of the identified electric power transmission unit, the control circuit controls at least one of the plurality of switching elements to switch the connection states of each of the electric power transmission units such that each electric power transmitting electrode is connected to the active terminal, the passive terminal, or the reference potential terminal.

9. The electric power transmitting apparatus according to claim 6, wherein based on the position of the identified electric power transmission unit, the control circuit controls at least one of the plurality of switching elements to switch the connection states of each of the electric power transmitting electrodes such that each electric power transmitting electrode is not connected to any of the active terminal, the passive terminal and the reference potential terminal.

10. The electric power transmitting apparatus according to claim 6, further comprising a first communication electrode.

11. The electric power transmitting apparatus according to claim 10, wherein the first active electrode, the first communication electrode, and the first passive electrode collectively generate capacitive coupling with the second active electrode, a second communication electrode, and the second passive electrode of the electric power receiving apparatus when the respective active, communication, and passive electrodes are positioned to oppose each other, respectively.

12. The electric power transmitting apparatus according to claim 1, wherein when one of the switching elements couples a respective electric power transmitting electrode to the active terminal, the respective coupled electric power transmitting electrode serves as the first active electrode for the capacitive coupling with the second active electrode of the electric power receiving apparatus.

13. The electric power transmitting apparatus according to claim 12, wherein when one of the switching elements couples a respective electric power transmitting electrode to the passive terminal, the respective coupled electric power transmitting electrode serves as the first passive electrode for the capacitive coupling with the second passive electrode of the electric power receiving apparatus.

14. An electric power transmitting apparatus that includes a first active electrode and a first passive electrode that generate capacitive coupling with a second active electrode and a second passive electrode of an electric power receiving apparatus when the respective active and passive electrodes are positioned to oppose each other, respectively, the apparatus comprising:
a power supply circuit including an active terminal and a passive terminal, the passive terminal having a lower potential than the active terminal;
an electric power transmitting surface having a plurality of electric power transmission units disposed thereon, and each electric power transmission unit comprising at least one electric power transmitting electrode;
a plurality of switching elements each coupled to a respective electric power transmitting electrode and each configured to switch connection states of the respective electric power transmitting electrode such that each electric power transmitting electrode is selectively switched to any one of a first connection state connected to the active terminal, a second connection state connected to the passive terminal, and a third connection state in which the respective electric power transmitting electrode is disconnected from both the active terminal and the passive terminal; and
a control circuit that controls the switching elements based on a position of the second active electrode and the second passive electrode of the electric power receiving apparatus when the electric power receiving apparatus is positioned on the electric power transmitting surface.

15. The electric power transmitting apparatus according to claim 14, further comprising a reference potential terminal coupled to a reference potential, wherein each of the plurality of switching elements is further configured to switching the respective connection state of the respective electric power transmitting electrode to be connected to the reference potential.

* * * * *